United States Patent
Brief et al.

[11] Patent Number: 5,875,210
[45] Date of Patent: Feb. 23, 1999

[54] METHOD AND APPARATUS FOR REPEATING DATA

[75] Inventors: David C. Brief, Palo Alto; Gregory L. DeJager, Campbell, both of Calif.; James R. Hamstra, Shorewood, Minn.

[73] Assignee: National Semiconductor Corporation, Santa Clara, Calif.

[21] Appl. No.: 801,109

[22] Filed: Feb. 13, 1997

Related U.S. Application Data

[63] Continuation of Ser. No. 210,189, Mar. 17, 1994, which is a continuation-in-part of Ser. No. 83,963, Jun. 24, 1993.

[51] Int. Cl.$^6$ .................................................. H04J 1/16
[52] U.S. Cl. ........................... 375/211; 370/226; 370/243; 379/338
[58] Field of Search ..................... 375/211, 212, 375/213; 370/243, 246, 274, 279, 293, 492, 501, 226, 315; 371/20.2; 379/4, 238, 296, 338; H04J 1/16

[56] References Cited

U.S. PATENT DOCUMENTS

| | | | |
|---|---|---|---|
| 4,530,088 | 7/1985 | Hamstra et al. ........................ | 345/250 |
| 4,692,894 | 9/1987 | Bemis ...................................... | 395/877 |
| 4,703,486 | 10/1987 | Bemis ....................................... | 371/41 |
| 4,706,081 | 11/1987 | Hart et al. ........................... | 340/825.03 |
| 4,835,776 | 5/1989 | Annamalai ................................ | 371/49 |
| 4,878,219 | 10/1989 | Kaufman et al. ......................... | 370/97 |
| 5,023,872 | 6/1991 | Annamalai ............................... | 371/5.1 |
| 5,072,447 | 12/1991 | Perloff et al. ........................... | 371/20.1 |
| 5,164,960 | 11/1992 | Wincn et al. .............................. | 375/10 |
| 5,185,863 | 2/1993 | Hamstra et al. ...................... | 370/110.1 |
| 5,222,130 | 6/1993 | Pflueger et al. ......................... | 379/399 |
| 5,299,195 | 3/1994 | Shah ........................................ | 370/85.6 |
| 5,301,303 | 4/1994 | Abraham et al. ........................ | 395/500 |
| 5,321,819 | 6/1994 | Szczepanek ............................. | 395/325 |
| 5,325,360 | 6/1994 | Friedrich et al. ........................ | 370/85.5 |
| 5,333,270 | 7/1994 | Brief et al. ................................ | 395/200 |
| 5,390,183 | 2/1995 | Friedrich et al. ..................... | 370/85.15 |
| 5,396,495 | 3/1995 | Moorwood et al. .................. | 370/85.11 |
| 5,438,571 | 8/1995 | Albrecht et al. ........................ | 370/94.3 |
| 5,440,557 | 8/1995 | Brief ..................................... | 370/85.14 |
| 5,442,628 | 8/1995 | Anderson et al. ........................ | 370/56 |
| 5,459,731 | 10/1995 | Brief et al. ............................... | 371/5.1 |
| 5,465,250 | 11/1995 | Brief ......................................... | 370/15 |
| 5,566,203 | 10/1996 | Brief et al. ............................... | 375/211 |

OTHER PUBLICATIONS

National Semiconductor's *Fiber Distributed Data Interface Designer's Guide*, No. 103751, 1990 Edition, Santa Clara, CA.

National Semiconductor's *Desktop FDDI Handbook*, No. 550137, 1992 Edition, Santa Clara, CA.

*FDDI Physical Layer Protocol (PHY–2)*, Draft Proposed American National Standard(ANSI). Rev. 5, Jun. 17, 1992.

(List continued on next page.)

*Primary Examiner*—Edward L. Coles
*Assistant Examiner*—Madeleine Au Nguyen
*Attorney, Agent, or Firm*—Skjerven, Morrill, MacPherson, Franklin & Friel; Michael Shenker

[57] ABSTRACT

A physical layer (PHY) device which can operate as a conventional PHY or as a repeater in a communication system. The PHY repeater supports four optional modes which may be enabled by programming control register bits with a microcontroller. These optional modes are: pass all symbols, enable noise filter, pass violation symbols and pass line states. When the pass all symbols, pass violation symbols and pass line states modes are enabled, the PHY device operates as a "transparent" repeater. The repeater allows errors in a data stream to be encoded and repeated without filtering to a downstream station. The repeater also allows line states to be repeated without station management software. A single repeater may be used to couple two stations or multiple repeaters may be connected to form multi-port repeater boxes which can be connected to facilitate more reliable connections between stations.

24 Claims, 9 Drawing Sheets

OTHER PUBLICATIONS

*FDDI Hybrid Ring Control (HRC), Draft Proposed American National Standard*(ANSI), Rev. 6.3, May 28, 1992.

U.S. Patent Application, Serial No. 08/028,342, filed Mar. 09, 1993; Title: "Hardware Based Physical Layer Controller Scrubbing and Method," Inventor: Friedrich.

*FDDI Station Management–2 Common Services*(SMT–2–CS), Working Draft Proposed American National Standard, Rev. 2.0, Jul. 5, 1993.

*FDDI Media Access Control (MAC–2)*, Working Draft Proposed American National Standard, Rev. 4.1, Sep. 3, 1992.

*FDDI Station Management–2 Packet Services (SMT–2–PS)*, Working Draft Proposed American Standard, Rev. 2.0, Jul. 12, 1993.

U.S. Patent Application Serial No. 08/588,971, filed Jan. 19, 1996, entitled "Intelligent Repeater Funtionality" by David C. Brief et al.

*FDDI Hybrid Ring Control(HRC) ,Draft Proposed American National Standard*(ANSI) , Rev. 6. 3, May 28, 1992.

*FDDI Station Management–2 Common Services (SMT–2–CS)*, Working Draft Proposed American National Standard, Rev. 2.0, Jul. 5, 1993.

METHOD AND APPARATUS FOR REPEATING DATA

CROSS-REFERENCES TO RELATED APPLICATION

This application is a continuation of application Ser. No. 08/210,189, filed Mar. 17. 1994, which is a Continuation In Part of Ser. No. 08/083,963, filed Jun. 24. 1993 now U.S. Pat. No. 5,566,203, issued on Oct. 15, 1996.

This application is related to, and incorporates by reference, the following U.S. patent applications: Application Ser. No. 08/082,678 entitled "Method and Apparatus for Trace Propagation in a Ring Network" filed by David C. Brief, Robert L. Macomber and James R. Hamstra on Jun. 24, 1993 now aababdoned; Application Ser. No. 08/082,193 entitled "Elasticity Buffer Control Method" filed by James R. Hamstra and David C. Brief on Jun. 24, 1993, now abandoned; Application Ser. No. 08/083,111 entitled "Hybrid Loopback for FDDI-II Slave Stations" filed by David C. Brief on Jun. 24, 1993, now U.S. Pat. No. 5,465,250 issued on Nov. 7, 1995; and Application Ser. No. 08/083,591 entitled "Link Error Monitoring" filed by David C. Brief, James F. Torgerson, and James R. Hamstra on Jun. 24, 1993, now U.S. Pat. No. 5,459,731 issued Oct. 17, 1995. This application also relates to U.S. Pat. No. 5,046,182, entitled "Code Points for Transferring Data from a Network Transmission Medium to a Station on the Network."

FIELD OF THE INVENTION

The present invention relates to data communication networks, and in particular, to a physical layer device (PHY) used as a repeater to couple segments of a communication network.

BACKGROUND OF THE INVENTION

Communication networks are widely used for transferring data between different systems such as, for example, computer systems and mass storage systems and other peripheral equipment.

In communication networks, when data are transmitted by a transmitting station to a receiving station, a repeater is sometimes required between the transmitting and receiving stations. The repeater may be necessary to boost a signal which must be transmitted over a long distance between the transmitting and receiving stations. In another application, the repeater interconnects two segments of a path having different transmission media, such as optical fiber and copper.

In communication networks, such as FDDI networks, errors present on a link between the transmitting and receiving stations (link errors) are counted by a physical layer device (PHY) in the receiving station. Link errors are encoded with communication symbols which eliminate run length error problems associated with certain link errors. These communication symbols are valid physical layer symbols, and thus the receiving station PHY does not recognize them as violations. These symbols are, however, recognized as violations by the receiving station Media Access Controller (MAC). Thus, when a conventional FDDI station is used as a repeater (FDDI station repeater), FDDI-I and FDDI-II standards are followed to filter a stream of 5-bit symbols that enters the station. Thus, when receiving a frame with a code violation (i.e., operating in basic (FDDI-I) mode), after counting the error, a FDDI station repeater replaces the violation symbols responsible for the code violation with four Halt symbols followed by an Idle line state. This Idle line state is transmitted to a downstream receiving station until the FDDI station repeater receives the next frame of data. When receiving a hybrid cycle with a code violation (i.e., operating in hybrid mode (FDDI-II) mode), after counting the error, the FDDI station repeater replaces the symbol responsible for the code violation with an L symbol. When receiving neither frames nor cycles, code violations are replaced with idle symbols.

A PHY detects a link error when either the current line state is active line state or cycle line state and a V symbol is decoded. This includes receipt of any invalid code point or a J or K which is not decoded as part of a starting delimiter. The PHY also detects a link error when the current line state is idle line state and any symbol except Q, H, I, J or K is decoded. This includes receipt of any invalid code point or a J or K which is not decoded as part of a starting delimiter.

A MAC layer device detects a format error when the MAC is in the process of receiving a frame or token and an error is detected that prevents complete reception. This includes receipt of any non data symbol except T or I (while receiving a frame or token).

Because conventional FDDI station repeaters transfer link errors into symbols which are valid for the PHY in the downstream station, these errors are not detected or counted by the link error monitor present in the PHY of the downstream receiving station. This allows errors to be isolated onto the link on which the errors occurred. This is undesirable in a repeater because the error count in the link error monitor of the PHY in the downstream station is deceptively low, making the link appear to be in a better condition than it actually is. The link error processing is consequently impeded. In addition, the FDDI station repeater is not "transparent" to the transmitting and receiving stations.

It is therefore desirable to have a repeater which will operate transparently. That is, the repeater will transmit violations with minimal filtering so that the PHY in a receiving station will be able to detect link errors that occurred between the upstream station and this station even if repeaters are present in the path. It is also desirable to have a repeater which transmits link error information using communication symbols which do not create run length problems within the receiving station. It is also desirable to have a repeater which can be programmed to operate as either a conventional FDDI repeater or as a "transparent" repeater.

In addition, prior art repeater stations require an FDDI station management entity. It is desirable to simplify repeater stations, and make them faster, by enabling them to operate without station management.

SUMMARY OF THE INVENTION

Accordingly, the present invention provides a repeater having a receiver and a transmitter. The receiver receives symbols from an upstream station and in response to these symbols, transmits symbols to the transmitter. The transmitter receives these symbols from the receiver, and generates symbols which are transmitted to a downstream receiving station.

In a pass violation symbols mode, the transmitter operates as follows. Upon detecting a violation symbol, or a symbol not valid in its present context, the transmitter transmits a preselected symbol recognizable as a violation symbol by a PHY in the downstream station.

In a pass line states mode, if the transmitter receives symbols which identify a line state, the identified line state is generated by the transmitter until another valid line state is identified by the transmitter or until the transmitter is reprogrammed.

In a pass all symbols mode, the receiver passes the received symbols to the transmitter without filtering. That is, each symbol received by the receiver is converted to a symbol which is representative of the symbol received by the receiver. The symbol transmitted from the receiver to the transmitter is capable of being converted back to symbol originally received by the transmitter.

In a noise filtering mode, if the receiver does not receive a known line state for a predetermined, programmed amount of time, the receiver replaces the incoming symbols with a symbol which causes the transmitter to be disabled. The transmitter remains disabled until the receiver receives a valid line state, the start of a frame or cycle, a reset signal, or a signal disabling the noise filtering mode.

Other features and advantages of the invention are described below. The invention is defined by the appended claims.

DETAILED DESCRIPTION OF THE INVENTION

Because the present invention is discussed in connection with an FDDI communication system, a brief overview of this type of system will be described to allow for better understanding of the invention. However, the present invention is not intended to be limited to FDDI systems.

Figure 1:
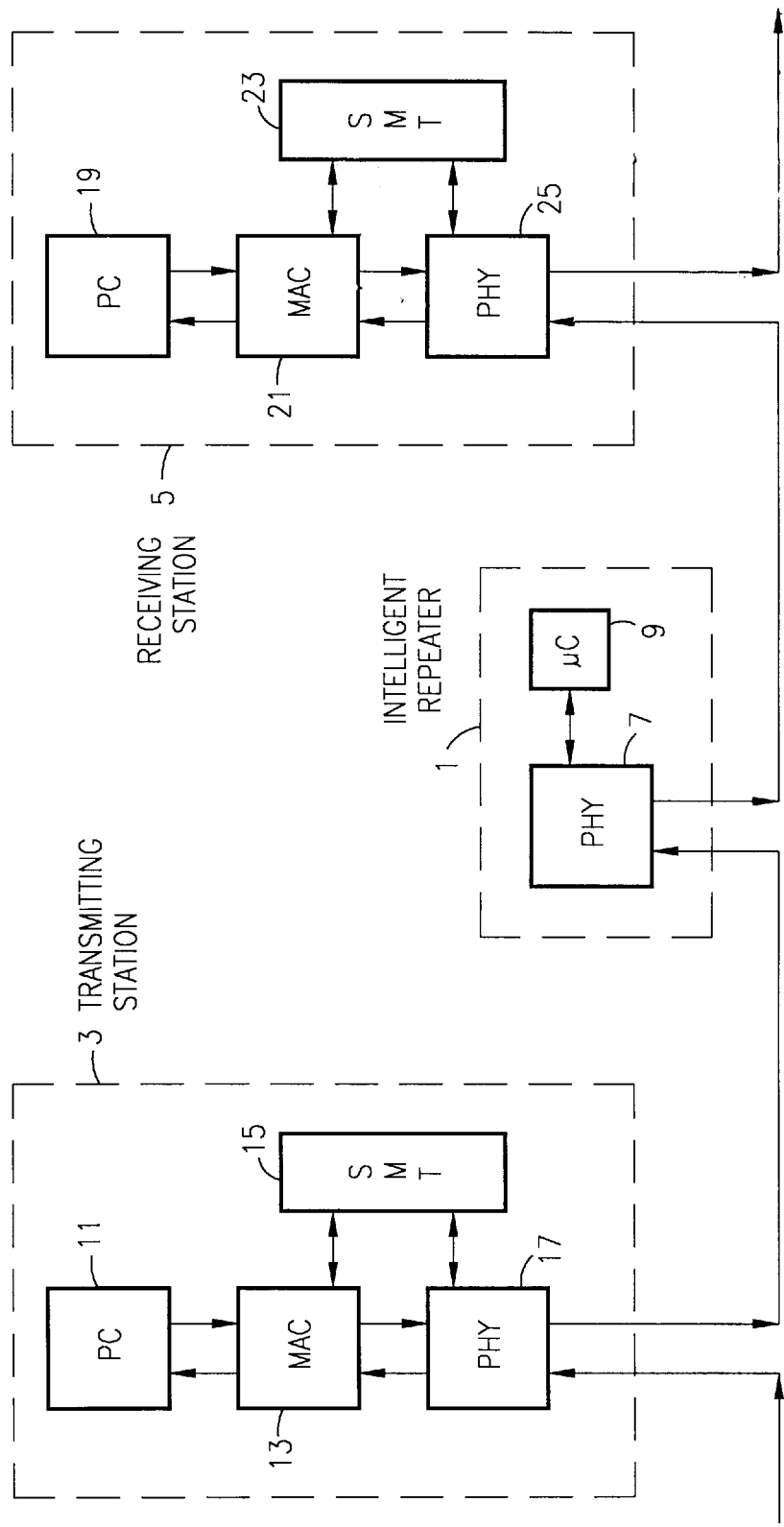
FIG. 1 is a block diagram showing the PHY repeater of the present invention connected as a repeater between two stations.

Information is transmitted on an FDDI ring in packets or frames (in FDDI-I basic mode) and cycles (in the hybrid mode in FDDI-II). Each frame or cycle consists of 5-bit characters or "symbols", each symbol representing 4 data bits. Tokens are used to signify the right to transmit packet data between stations on the network. As shown in FIG. 1, a "station" can include, for example, a computer (PC) 11, a media access controller (MAC) 13, station management (SMT) 15 and a physical layer device (PHY) 17.

Of the thirty-two possible 5-bit symbol codes, 16 are data symbols (each representing four bits of ordinary binary data), 8 are control symbols, and 8 are violation symbols. The eight control symbols include J (the first symbol of a starting delimiter byte JK), K (the second symbol of the starting delimiter byte JK), I (Idle), H (Halt), Q (Quiet), T (End delimiter), S (Set), R (Reset), and L (Limiter). The violation symbols of the FDDI standard symbol set are not used because they violate code run length or DC balance requirements of the protocol.

Line states represent a long term condition of the link. A continuous stream of control symbol patterns defines a line state. The FDDI protocol defines seven line states, including Idle Line State (ILS), Quiet Line State (QLS), Halt Line State (HLS), Master Line State (MLS), reception of a start delimiter symbol pair JK or Active Line State (ALS), Noise Line State (NLS) and Line State Unknown (LSU). These line states are used to monitor and control the operation of the link. Line states are transferred between two stations to establish operational links, to monitor link quality and to provide for time-outs.

Further information on FDDI and FDDI-II is provided in the following publications which are hereby incorporated herein by reference: *FDDI Physical Layer Protocol (PHY-2), Draft Proposed American National Standard*, American National Standards Institute ("ANSI"), Jun. 17, 1992, incorporated herein by reference also include MAC-2; *FDDI Hybrid Ring Control (HRC), Draft Proposed American National Standard*, May 28, 1992 incorporated herein by reference; *FDDI Station Management-2 Common Services (SMT-2-CS), Working Draft Proposed American National Standard*, Jul. 5, 1993, incorporated herein by reference; *FDDI Media Access Control (MAC-2), Working Draft Proposed American National Standard* Sep. 3, 1992, incorporated herein by reference; *FDDI Station Manaaement-2 Packet Services (SMT-2-PS), Working Draft Proposed American National Standard*, Jul. 12, 1993 incorporated herein by reference;

Conventional FDDI repeaters require software support from their associated station management (SMT) to process line state information. Upon detecting a line state from an upstream transmitting station, the repeater encodes the line state information and provides this encoded information to the SMT. Based on the particular line state received and other conditions in the FDDI network, the SMT software determines which line state should be transmitted. The SMT instructs a transmitter within the repeater to generate this line state and send it to a downstream receiving station. The SNT requires line states to be transmitted for at least 50 μsec (TL_MIN) and allows implementations up to 25 μsec (TL_MAX) to detect a line state. This implies that all repeaters between stations must repeat line states within 25 μsec. Software processing results in slower propagation of line state information. This reduces the number of repeaters that can be connected in series between two stations.

Turning now to the present invention, FIG. 1 shows a PHY 7 which is configured to operate as a repeater between a transmitting station 3 and a receiving station 5. The repeater 1 includes PHY 7 and microcontroller 9. The transmitting station 3 includes PC 11, MAC 13, SMT 15 and PHY 17. The receiving station S includes PC 19, MAC 21, SMT 23 and PHY 25.

Figure 2:
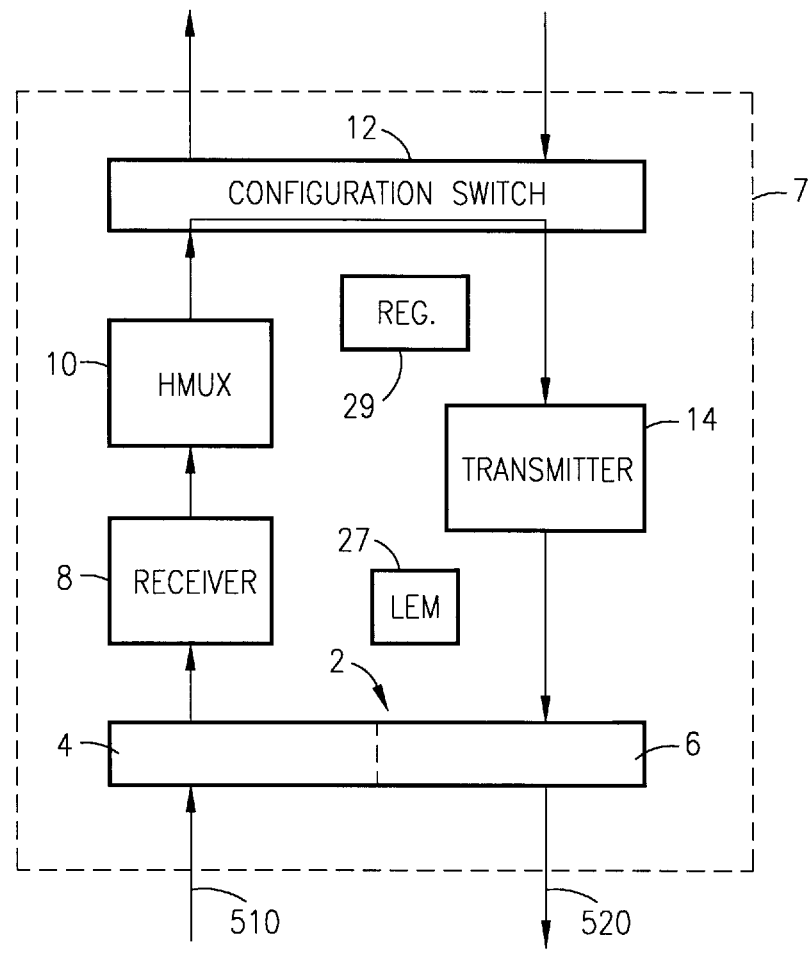
FIG. 2 is a block diagram of the PHY repeater of the present invention.

FIG. 2 is a block diagram of PHY 7 of the repeater 1, including the phaser 2, receiver 8, HMUX 10, configuration switch 12 and transmitter 14. The receiver 8, configuration switch 12 and transmitter 14 are shown in more detail in FIGS. 7, 3 and 8, respectively. The functions performed by the various blocks are described below. Details of the PHY repeater in accordance with the present invention are set forth in the state diagram in FIG. 9, and a hardware description language (RTL) in Addenda A–E.

Turning now to FIG. 2, the incoming link from station 3 is connected through a Physical Medium Dependent (PMD)

device (not shown) to port 510 which is connected to a clock recovery block 4. The outgoing link to station 5 is connected through the PMD device to port 520, which is connected to a clock generation block 6. The clock recovery block 4 extracts the stream of 5-bit symbols and the synchronized 125 Mhz clock from the incoming data stream and provides these signals to the receiver block 8. Phasers such as phaser 2 are known in the art. A detailed description of such a phaser is provided in National Semiconductor's data sheet for the DP83256/DP83257 PLAYER+ Device, (National Semiconductor Desktop FDDI Handbook, 1992 Edition), which is herein incorporated by reference.

The Receiver Block

The receiver block 8 includes control and status registers (not shown) which provide an interface to an external device such as a microcontroller or a station management block. During operation as a repeater as shown in FIG. 1, microcontroller 9 programs two bits (not shown) in these control and status registers. Each of these two bits enables a separate feature within the receiver 8.

One of these features is a pass all symbols mode. When the pass all symbols mode is enabled, the receiver 8 passes the received symbols without filtering. That is, each 5-bit symbol received by the receiver is converted to a 4-bit symbol which is representative of the 5-bit symbol. The 4-bit symbol is capable of being converted back to a 5-bit symbol by the transmitter 14. This 5-bit symbol may be interpreted by PHY 25 in downstream receiving station 5 as if the downstream station 5 had received the 5-bit symbol originally received by the receiver 8.

For example, when the pass all symbols mode is enabled, the receiver 8 encodes a received 5-bit violation symbol into a 4-bit V symbol (0010). This V symbol is provided to the transmitter 14 (through HMUX block 10 and configuration switch 12 that are described below), where the symbol may subsequently be decoded to a pre-selected 5-bit violation symbol (K or 10001). Whether the transmitter decodes the V symbol into the preselected violation symbol is determined by which mode or modes are enabled in the transmitter 14. Although the transmitter modes, pass violation symbols and pass line states, are discussed in detail below, it is now noted that if the pass violation symbols mode of the transmitter is enabled, and (1) the pass line states mode of the transmitter is disabled, or (2) the pass line states mode of the transmitter is enabled and the transmitter is not generating a master, quiet or halt line state, the transmitter will decode a received V symbol as the 5-bit, preselected violation symbol, K.

If the receiver receives a J symbol followed by a violation symbol, the receiver replaces both the J symbol and the violation symbol with a 4-bit V symbol. This prevents the erroneous creation by the transmitter of a JK symbol pair which could be interpreted by the downstream station as a starting delimiter.

When the pass all symbols mode is enabled, the receiver 8 encodes each 5-bit symbol which is invalid in its present context to a 4-bit symbol representative of the 5-bit symbol. An example of a symbol which is invalid in its present context is an R symbol which appears in the preamble of a frame. The receiver 8 encodes the 5-bit R symbol to a 4-bit symbol (0110) which may subsequently be decoded to a 5-bit R symbol by transmitter 14 and transmitted to the downstream station 5. Whether the transmitter performs this decoding depends upon whether the pass line states mode of the transmitter is enabled. The transmitter decodes the 4-bit symbol (0110) to the R symbol as previously described if the pass line states mode of the transmitter is disabled, or if the pass line states mode is enabled and a master, quiet or halt line state has not currently been generated by the transmitter immediately before the transmitter received the 4-bit symbol (0110).

The pass all symbols mode of the receiver 8 therefore allows violation symbols and symbols not valid in their present context to be transmitted through repeater 1 and detected by a link error monitor (not shown) in PHY 25 of downstream station S. There is a similar link error monitor 27 in PHY 7. These link error monitors detect an error when a violation symbol is received by the PHY receiver in active line state or cycle line state. These link error monitors also detect an error during an idle line state when the symbol received by receiver 8 is a symbol other than Q, H, I or J followed by a K (the JK starting delimiter).

If the pass all symbols mode is not enabled, the receiver block 8 filters out violation symbols and symbols which are not valid in their present context, replacing such symbols with an L, T, or I symbol according to Addenda C, D. Thus, while receiving a preamble (State HRXO under the heading "Receiver State Machine Actions" in Addendum D), only idle symbols are valid symbols. Any other symbol received in a preamble is replaced by the receiver with an idle symbol.

While receiving a cycle control field (State HRX1 in Addendum D) or a programming template field (State HRX3), R, S and T symbols are the only valid symbols. During these states, any symbols other than R, S or T are replaced by the receiver with a T symbol.

While receiving a cycle body (State HRX4), data symbols (N symbols), I, L, R, S and T symbols are the only valid symbols. Information inside a frame or cycle is transmitted in octets, each of which is a symbol pair. In the HRX4 state, any symbol other than N, I, L, R, S or T is replaced by the receiver with an L symbol. This occurs unless the upper symbol (i.e., the first symbol) of a symbol pair with an error in the lower symbol is an I symbol. If the upper symbol of the symbol pair is an I symbol and the lower symbol (i.e., the second symbol) is a symbol other than N, I, L, R, S or T, the lower symbol is replaced by the receiver with an I symbol. This prevents the erroneous creation of an embedded starting delimiter, IL, which indicates the beginning of a packet within a cycle.

While receiving a frame (State HRX5), if both symbols of the symbol pair are not data symbols (NN), then I, L, R, S and T are the only valid symbols. Any symbol other than I, L, R, S or T is replaced with an L symbol, unless the upper symbol of the symbol pair is an I symbol. If the upper symbol of the symbol pair is an I symbol and the lower symbol is a symbol other than I, L, R, S or T, the lower symbol is replaced with an I symbol. While receiving a frame, if one or more symbols of the symbol pair is a data symbol (N), then N, I, L, R, S and T symbols are the only valid symbols. In this case, any symbol other than N, I, L, R, S or T is replaced with an L symbol, unless the upper symbol of the symbol pair is an I symbol. If the upper symbol of the symbol pair is an I symbol and the lower symbol is a symbol other than N, I, L, R, S or T, the lower symbol is replaced with an I symbol.

The other feature which may be enabled by the control registers in the receiver 8 is a noise filtering mode which is described in Addendum E.

When the noise filtering mode is enabled, if the receiver 8 does not receive a known line state for a predetermined, programmed amount of time, a noise threshold bit in a register of the receiver is set. The receiver 8 then generates a control signal which causes the incoming data stream to be replaced with a PHY_Invalid code point (smPIV in Table B). This code point, when decoded by the transmitter will cause the off transmit mode to be entered. The off transmit mode is similar to quiet line state, but in the off transmit mode, transmitter 12 is disabled. The off transmit mode continues until a valid line state (ILS, HLS, MLS, QLS or NSD) is received, a start of a frame or a start of a cycle is received, a PHY Reset signal is received, the noise threshold bit is reset or the noise filtering mode is disabled.

When the downstream receiving station 5 detects that transmitter 12 has been disabled (i.e., when receiving station 5 stops receiving a signal from PHY 7), the SMT 23 within the receiving station 5 breaks the connection with the upstream transmitting station 3 and may subsequently initiate line state signalling in an attempt to re-initialize the connection.

If the noise filter is not enabled, the receiver 8 does not perform the noise filtering described above, regardless of how long it takes for the receiver 8 to receive a known line state. Whether the noise filter is enabled or disabled, a noise condition that exceeds the predetermined threshold time period is always reported to microcontroller 9. Microcontroller 9 detects these noise conditions by monitoring the previously described noise threshold bit.

The HMUX Block

The output of receiver block 8 is provided to the HMUX block 10. The HMUX block 10 performs the functions defined in *FDDI Hybrid Ring Control (HRC), Draft Proposed American National Standard*, May 28, 1992 which is incorporated herein by reference. The operation of the HMUX block 10 is described in detail in U.S. patent application Ser. No. 08/083,111, filed by David C. Brief on Jun. 24, 1993, now U.S. Pat. No. 5,465,250 issued on Nov. 7, 1995, which is incorporated herein by reference. In alternate embodiments, the HMUX block 10 is omitted.

The Configuration Switch

As shown in FIG. 2, the configuration switch 12 receives an input from the HMUX block 10, or, in the embodiments omitting the HMUX block, from receiver 8. During operation as a repeater as shown in FIG. 1, the configuration switch 12 routes the output of the HMUX block 10 to the transmitter block 14. In alternate embodiments, the configuration switch 12 routes the output of HMUX block 10 to a transmitter block outside of PHY 7 and allows transmitter block 14 to receive an input from an HMUX or receiver block outside of PHY 7.

The Transmitter Block

The transmitter block 14 includes control and status registers (not shown) which provide an interface to an external device such as a microcontroller or a station management block. During operation as a repeater as shown in FIG. 1, microcontroller 9 programs two bits (not shown) in a control register within transmitter block 14. Each of these two bits enables a separate feature within the transmitter 14.

One of these features is a pass violation symbol mode. When the pass violation symbol mode is enabled, the transmitter 14 replaces received violation symbols with the FDDI symbol, K (10001). The K symbols are propagated to the downstream receiving station 5, where they are recognized as violations by a link error monitor (not shown) in the physical layer device 25. This link error monitor is similar to link error monitor 27 shown in FIG. 2. Thus, the pass violation symbol mode allows the repeater 1 to pass all errors to the downstream station through 0 or more additional repeaters. Transmission of the K symbol as a substitute for arbitrary violation symbols maintains valid run length and DC balance on the link while ensuring that a violation will be detected by the physical layer device 25.

If the pass violation symbol mode is not enabled, the transmitter 14 operates according to FDDI-I and FDDI-II standards. Thus, for frames (FDDI-I and basic mode in FDDI-II), a violation symbol is coded as four halt symbols followed by an idle line state. For cycles (FDDI-II hybrid mode), a violation symbol is coded as one or more L symbols. When receiving neither frames nor cycles, violations are replaced with idle symbols. The four halt symbols followed by an idle line state or the one or more L symbols are recognized as a violation by the media access controller 21 in the downstream receiving station 5, but not necessarily by the physical layer device 25.

Figure 9:
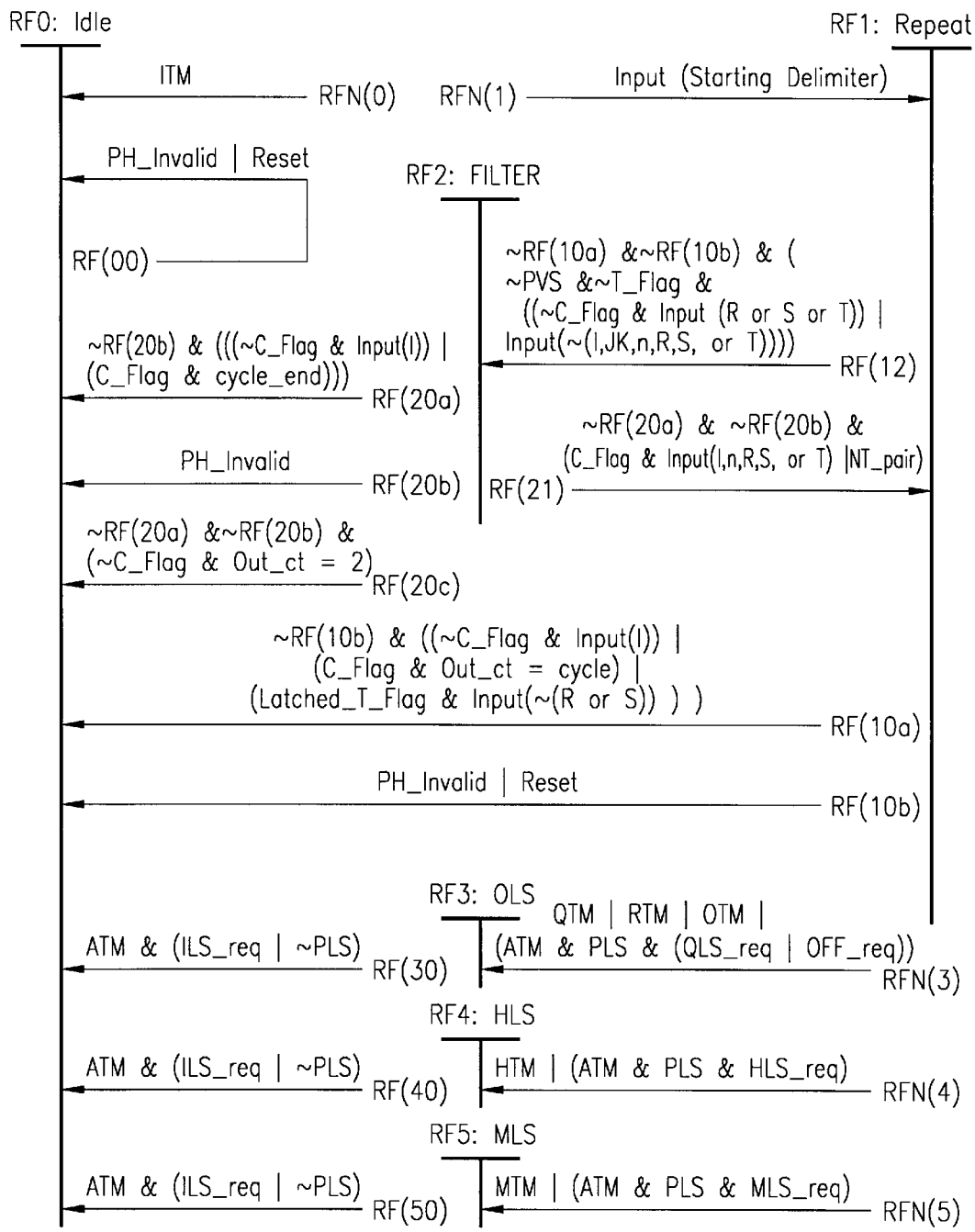
FIG. 9 is a state diagram for the repeat filter/line state generator of the transmitter.

The other feature which may be enabled by the control and status registers within the transmitter 14 is a pass line states mode. When the pass line states mode is enabled, if the data stream received from configuration switch 12 contains control symbols identifying a line state, the corresponding line state is generated by the transmitter 14. If the pass line state mode is enabled and a halt line state is decoded by the transmitter from the data stream from configuration switch 12, the transmitter 14 will continue to generate the halt line state, until another valid line state is decoded by the transmitter and/or until the Current Transmit State Register (CTSR, not shown) within a transmitter register is reprogrammed as indicated in FIG. 9 and Addenda A and B. Similarly, if a quiet line state is decoded by the transmitter, transmitter 14 will continue to generate the quiet line state until another valid line state is decoded or the register CTSR is reprogrammed. If a master line state is decoded, transmitter 14 will continue to generate the master line state until another valid line state is generated or the register CTSR is reprogrammed. Consequently, when the pass line states mode is enabled and the transmitter 14 is generating a quiet, master or halt line state, all violation symbols received by the transmitter 14 during this time are filtered, even if the pass violation symbols mode is enabled.

When the pass line state mode is not enabled, the transmitter 14 operates as a conventional PHY transmitter. Thus, the transmitter 14 generates line states which are determined by the MAC 21 in the station or by the microcontroller 9 based on the current line state and current system conditions. These generated line states replace the incoming data from the configuration switch 12.

Figure 4:
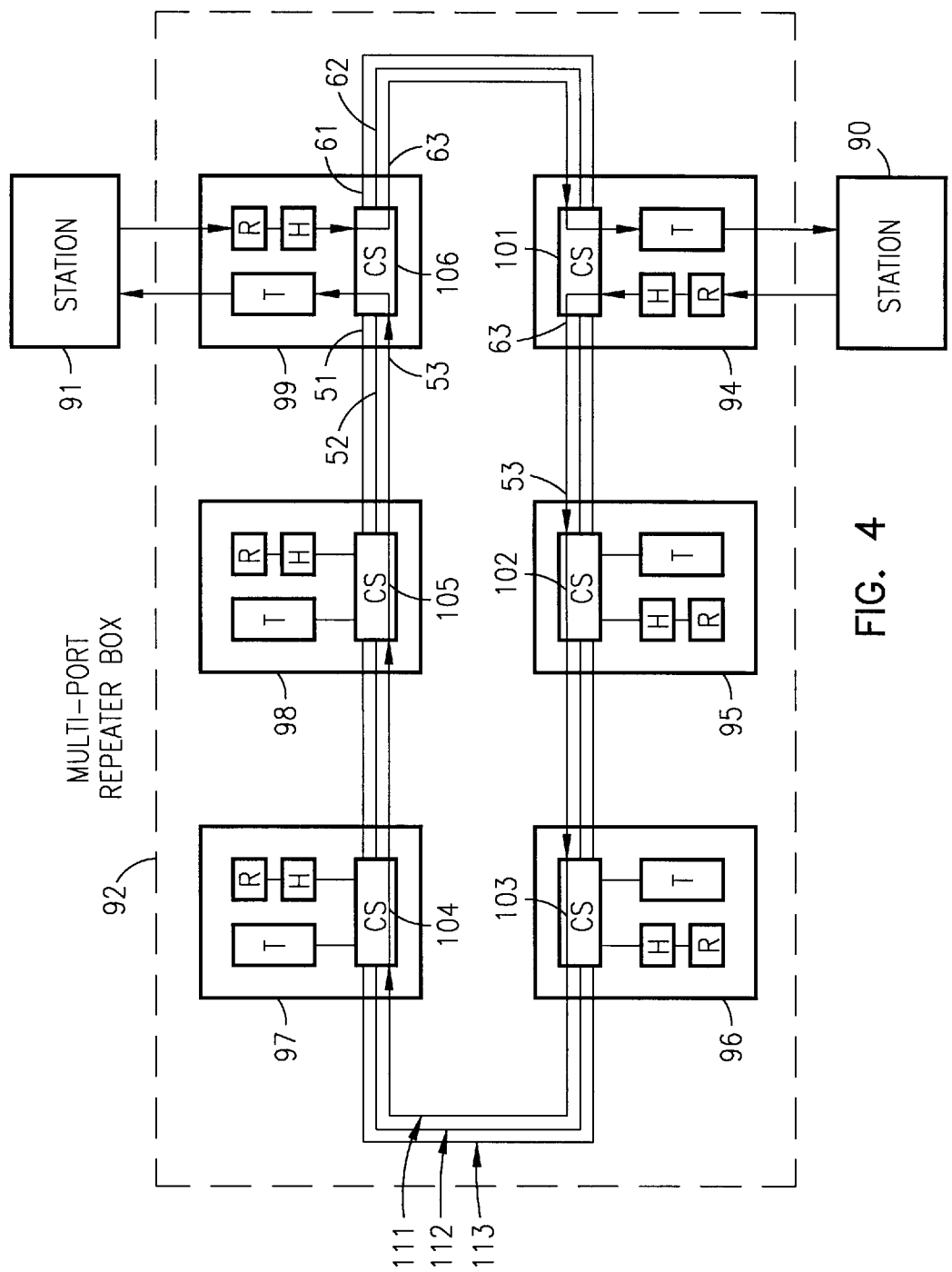
FIG. 4 is a block diagram of a multi-port repeater box formed by six of the PHY repeaters of the present invention.
Figure 5:
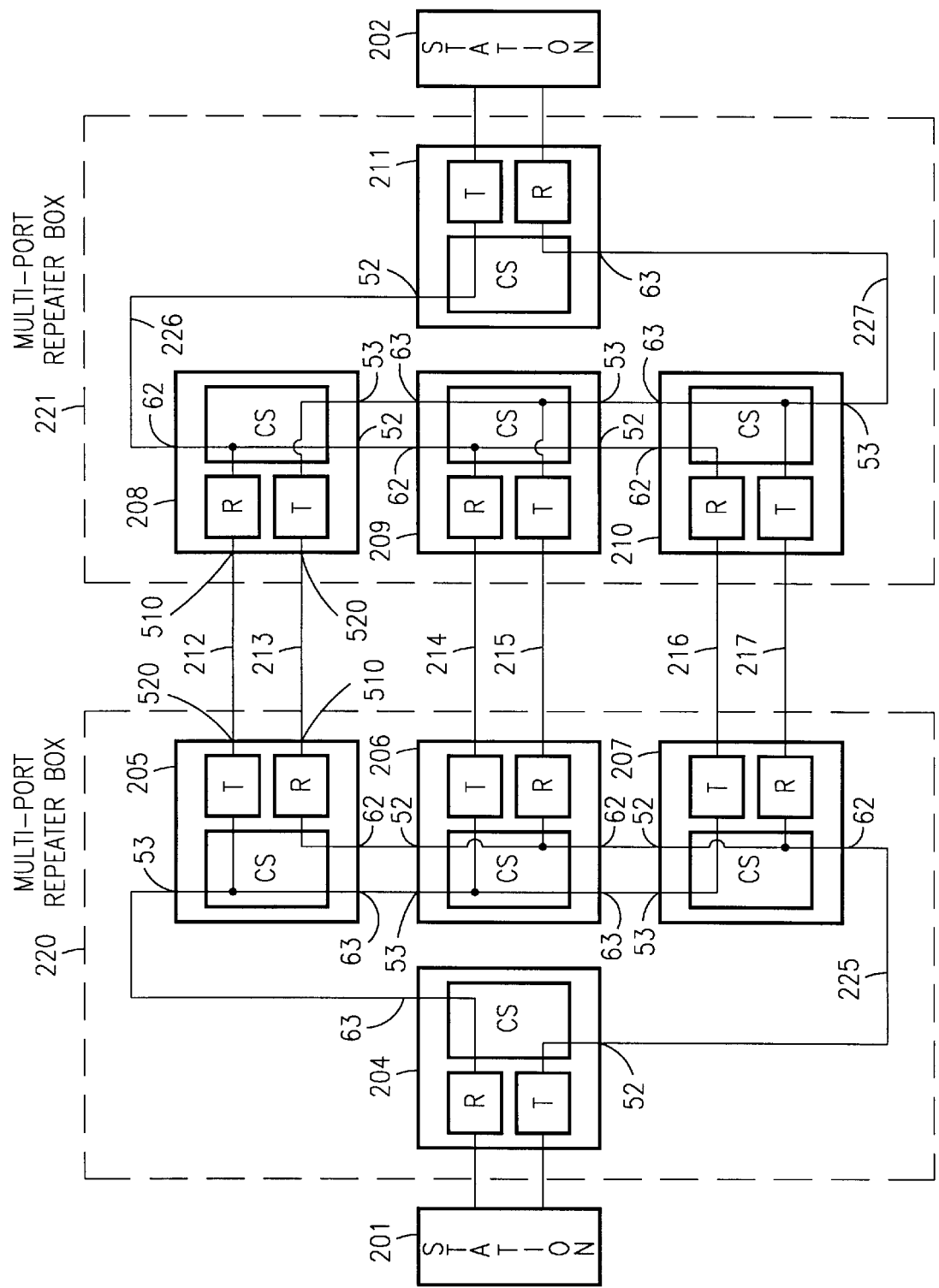
FIG. 5 is a block diagram of a circuit with redundant data links formed by multi-port repeater boxes.
Figure 6:
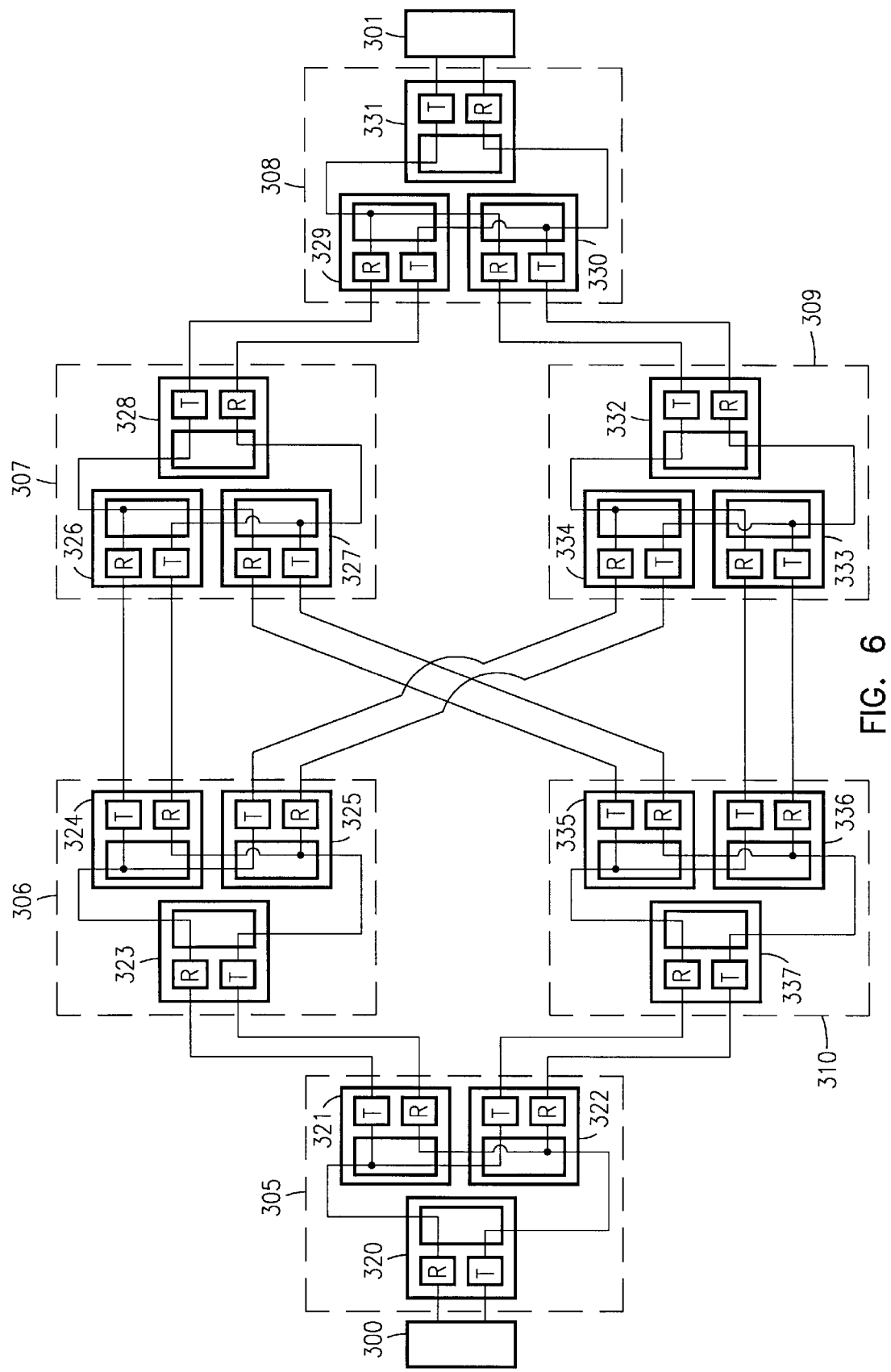
FIG. 6 is a block diagram of a fault tolerant circuit formed by multi-port repeater boxes.

The pass all symbols, pass violation symbols and pass line states modes of the present invention allow the transmitter 14 to be decoupled from the receiver 8 and thereby allow for sophisticated multi-port repeater configurations since the transmitter within a repeater can be functionally coupled with either the receiver of the same PHY or the receiver of another PHY as shown in FIGS. 4–6 discussed below.

Details of The Configuration Switch

Figure 3:
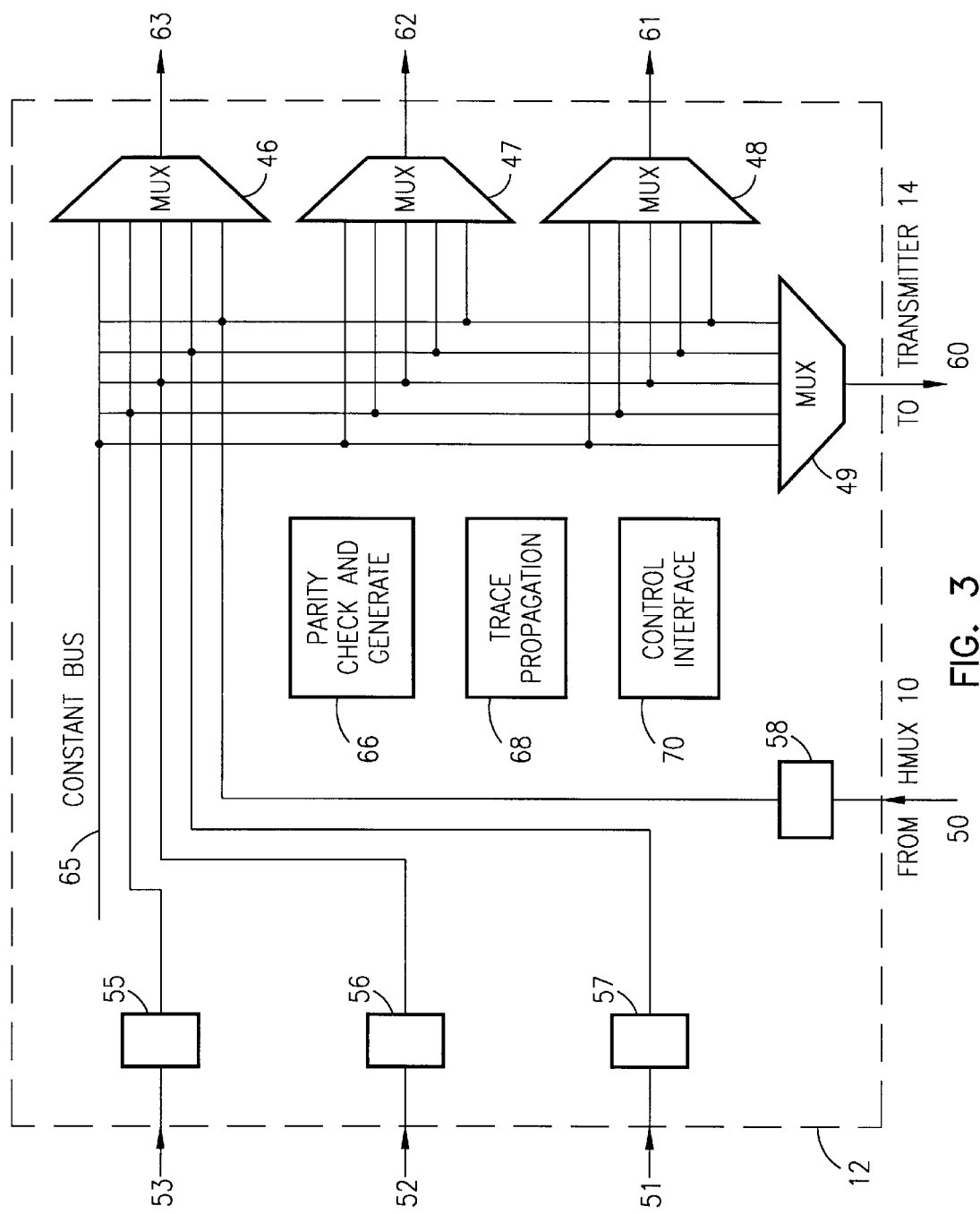
FIG. 3 is a block diagram of the configuration switch of the PHY repeater of the present invention.

As shown in FIG. 3, the configuration switch 12 includes four inputs 50–53 and four outputs 60–63. The output of HMUX block 10 is connected to input 50 within the PHY 7. The output 60 of multiplexer 49 is connected to the transmitter block 14 within the PHY 7. Latches 55–58 are provided at respective inputs 53, 52, 51, 50. Each of inputs 50–53 and outputs 60–63 is twelve bits wide: eight bits are for a symbol pair, one bit for parity, one bit to indicate if the two symbols are control or data, and two bits for tags that are ignored in the repeater applications. Multiplexers 46–49 provide data path configuration options. The multiplexers 46–49 may be set such that a closed data path is formed between any of the inputs 50–53 and any of the external outputs 60–63. One input may drive multiple outputs. The multiplexers 46–49 are set by programming bits (not shown) in two registers (not shown) in control register block 29

(FIG. 2). These configuration options are used to implement fault-tolerant systems of multiple repeaters and multiple data links.

The configuration switch 12 also includes a constant bus 65 (which carries fixed 10-bit patterns used during a connection process, to signify PHY_Invalid or to indicate a parity error), a logic block 66 to check and generate parity, a trace propagation block 68 and a control interface block 70 which couples the multiplexers 46–49 to control register block 29. In the repeater embodiment shown in FIG. 1, the internal multiplexers 46–49 are set so that a closed data path exists between input 50 (from the receiver 8 and HMUX block 10) and output 60 (to transmitter 14). Inputs 51–53 and outputs 61–63 are not used when the PHY is in the repeater mode shown in FIG. 1. In an alternative embodiment, a bidirectional repeater function is performed by interconnecting two repeaters via heir external interface ports 51–53 and 61–63 as described below.

A receiver of a first PHY repeater can be connected to a transmitter of a second PHY repeater by coupling input 50 to one of outputs 61–63, which is connected to one of inputs 51–53 of the second PHY. That input of the second PHY is coupled to the PHY output 60. These capabilities allow PHY repeaters in accordance with the present invention to be connected to form multi-port repeater boxes which serve several stations. Several embodiments using PHY repeaters to create multi-port repeater boxes are described below. These embodiments are not limited to FDDI.

One such embodiment is illustrated in FIG. 4. Repeater box 92 does not have station management capabilities. PHY repeaters 94–99 of box 92 are used to connect station 90 and station 91 in a looped configuration. The receiver, HMUX, configuration switch and transmitter blocks are generically labelled R, H, CS and T, respectively. The data from station 90 is routed through the receiver and HMUX of PHY repeater 94. Configuration switch 101 of PHY 94 couples input 50 (FIG. 3) to output 63 thus routing the data to input 53 of PHY 95. Configuration switches 102–105 of respective PHYs 95–98 couple their respective inputs 53 to outputs 63 to route the data through to configuration switch 106. Configuration switch 106 couples its input 53 to its output 60 to route the data to the transmitter of PHY repeater 99. The data is then provided to station 91.

Station 91 transmits data through the receiver and HMUX blocks of PHY repeater 99 to configuration switch 106. Configuration switch 106 couples its input 50 to its output 63 to route the data to configuration switch 101. Configuration switch 101 routes the data to the transmitter of PHY repeater 94. The data is provided from the transmitter of PHY repeater 94 to station 90, thereby completing the first path 111.

Although this example illustrates a specific path, other paths may be chosen. With three paths 111–113 and six ports (through PHY repeaters 94–99), any three pairs of ports can simultaneously be provided with full duplex repeater capabilities. Thus, a station connected to PHY 97 can be connected to a station connected to any of the remaining PHYs 95, 96, 98 using the second path 112. Simultaneously, stations connected to the two remaining PHYs can be connected together using the third path 113. In PHY repeaters 94 through 99, pass all symbols, pass violation symbols and pass line states modes are enabled.

An advantage of a programmable configuration switch is that any of the PHYs 94–99 can also be used as part of a station having a MAC and an SMT.

In another embodiment shown in FIG. 5, multiple repeaters 204–211 are configured to form multi-port repeater boxes 220 and 221. Repeater boxes 220 and 221 provide redundant data links 212–217 between two stations 201, 202. The transmitter, receiver and configuration switch within each of the repeaters 204–211 are identified by the letters T, R, and CS, respectively. Output 63 of repeater 204 is connected to input 53 of repeater 205. Outputs 63 of repeaters 205, 206 are connected respectively to inputs 53 of respective repeaters 206, 207. Configuration switch in PHY 204 connects output 63 to input 50 i.e., from the receiver. Outputs 62 of repeaters 205, 206, 207 are connected respectively to inputs 52 of 206, 207, 204. Input 52 in PHY 204 is connected by the configuration switch to the transmitter. Similarly, outputs 63 of repeaters 202, 210, 209 are connected respectively to inputs 53 of repeaters 210, 209, 208. Outputs 62 of repeaters 210, 209, 208 are connected respectively to inputs 52 of repeaters 209, 208, 211. In PHY 211, the configuration switch connects output 63 to the receiver and input 52 to the transmitter.

Outputs 510 of repeaters 205, 206, 207 are connected respectively to inputs 520 of repeaters 208, 209, 210 by respective lines 213, 215, 217 through PMD devices (not shown). Similarly, outputs 510 of repeaters 208, 209, 210 are connected respectively to inputs 520 of repeaters 205, 206, 207 by respective lines 212, 214, 216. The receiver of PHY repeater 204 receives data from station 201. The transmitter of PHY 211 is connected through port 520 to station 202. One link with the best properties (e.g. lowest delay, lowest link error rate, etc.) is selected from links 212, 214, 216 to provide a path from station 201 to station 202. To select, for example, link 214, the transmitter of PHY 206 is connected to input 53. In PHY 205, input 53 is connected to output 63. In PHY 209, the receiver is connected to output 62. In PHY 208, input 52 is connected to output 62, providing a data path to station 202. Similarly, one link with the best properties is selected from links 213, 215 and 217 by setting the PHY configuration switches appropriately. In 10 some embodiments, only one configuration switch in repeaters 205–207 is configured to transfer data to one of the transmitters in PHY repeaters 205–207. Only one of the configuration switches in repeaters 208–210 is configured to transfer data from the respective receiver onto the internal path 226 at any given time. Similarly, only one of the configuration switches in repeaters 208210 is configured to transfer data to one of the transmitters in PHY repeaters 208–210. Also, only one of the configuration switches in repeaters 205–207 is configured to transfer data from the respective receiver onto internal path 225. This embodiment allows for reconfiguration around degrading or broken links. In PHY repeaters 204–211, pass all symbols and pass violation symbols modes are enabled. Pass line states is also enabled in PHY repeaters 204–211. This embodiment is not limited to the three links (212–213, 214–215, and 216–217) shown.

In another embodiment shown in FIG. 6, multiple repeaters 320–337 are configured to provide multi-port repeater boxes 305–310. These repeater boxes 305–310 are configured as a fault tolerant network connecting stations 300 and 301. This fault tolerant network allows for continued operation between stations 300 and 301 in the event of a fault along any single pair of connectors between any two of the repeater boxes 305–310. This fault tolerant configuration also allows for continued operation between stations 300 and 301 in the event that any one of the repeater boxes 305–310 becomes inoperable. The transmitter and receiver within each of the repeaters 320–337 are identified by the letters T and R, respectively. The unlabeled box within each of the repeaters 320–337 is a configuration switch. In PHY repeaters 320–337, the pass all symbols, pass violation symbols and pass line states modes are enabled.

Although these examples illustrate specific configurations of multi-port repeater boxes, other configurations will be apparent to those of ordinary skill in the art.

Details of The Receiver Block

Figure 7:
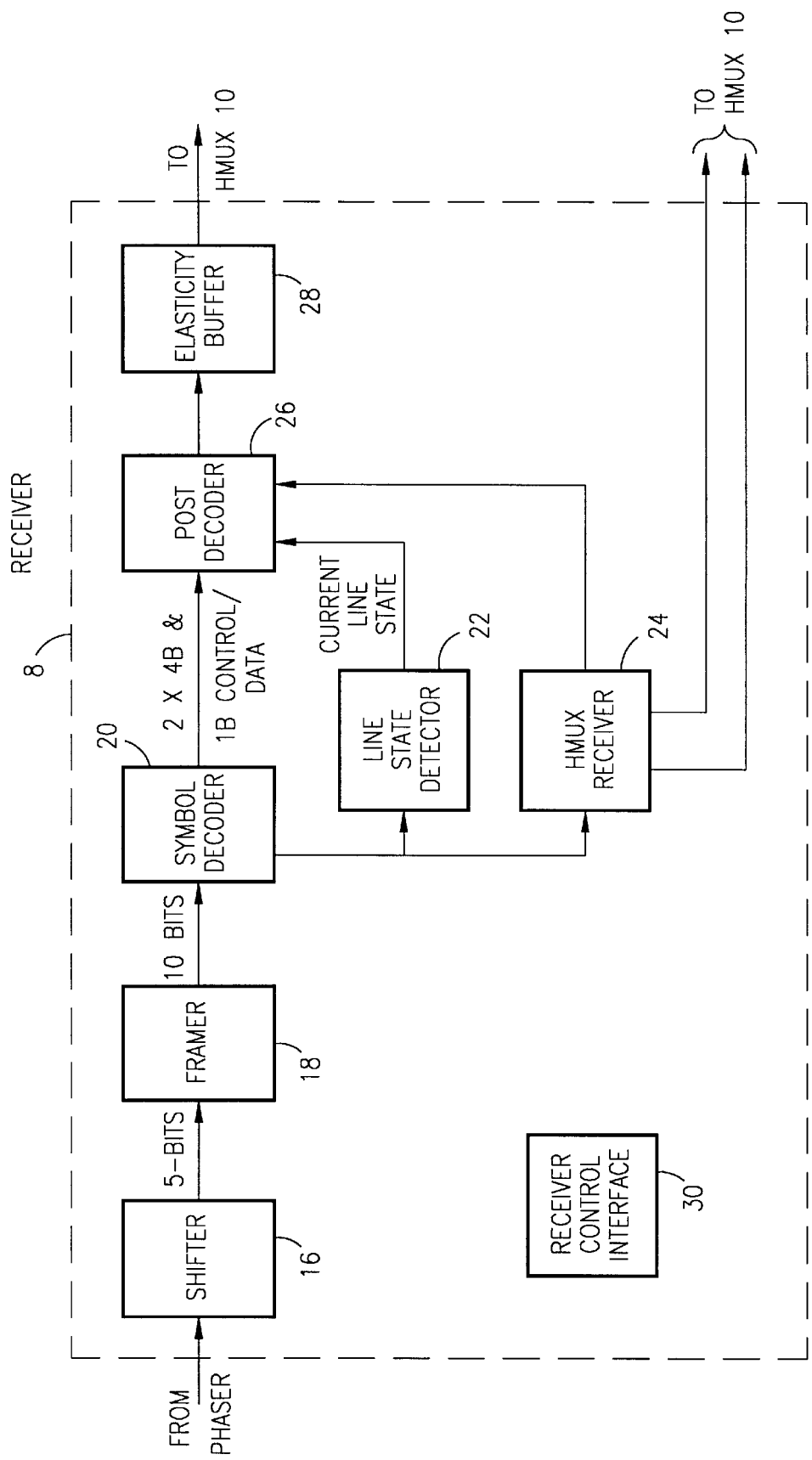
FIG. 7 is a block diagram of the receiver of the PHY repeater of the present invention.

The receiver block 8 is shown in more detail in FIG. 7. The serial data from phaser 2 is input to a shifter 16 which performs a high speed serial to parallel conversion along with an NRZI (Non-Return-to-Zero-Invert-On-Ones) to NRZ (Non-Return-to-Zero) conversion.

The shifter 16 provides a stream of 5-bit symbols to the framer 18. The framer 18 combines pairs of 5-bit symbols to produce a 10-bit byte stream that is aligned with the current byte boundary as defined by the received starting delimiters and line state patterns.

The symbol decoder 20 receives the aligned pairs of 5-bit symbols from the framer 18 and encodes each pair into a pair of 4-bit symbols. An additional bit is included with the pair of 4-bit symbols to indicate whether the pair of 4-bit symbols represent data values or control symbols. The conversion from 5-bit data symbols to 4-bit data symbols is illustrated in the upper portion of Table A. Thus, the pair of 5-bit data symbols, 01001 10100, is converted to the pair of 4-bit data symbols, 0001 0010, plus an additional bit which indicates these are data values, rather than control signals.

The conversion from pairs of 5-bit control signals to pairs of 4-bit control signals is illustrated in the lower portion of Table A and in Table B. First, the letters corresponding to the pair of 5-bit control symbols are determined from the lower portion of Table A. For example, the letters corresponding to the pair of 5-bit control symbols, 11110 00001 are NV. Next, the pair of 4-bit control symbols corresponding to these letters is determined from a set of internal codes shown in Table B. The "upper symbol" is the first 4-bit symbol of the generated control symbol pair and the "lower symbol" is the second 4-bit symbol of the generated control symbol pair. Thus, NV becomes 0000 0010, plus an additional bit which indicates these are control symbols, rather than data symbols.

In Table B, the following internal codes identify starting delimiters: SFS (start of frame sequence), SAS (Start of abort sequence), SSC (Start of slave cycle), SCC (Start of changed cycle), SMC (Start of master cycle). The following internal codes identify error conditions (in addition to V symbols): N (Data symbols mixed with non-data symbols. The data symbol is turned into an N and the entire byte is designated as a control symbol), PERR (parity error detected at configuration switch), IERR (internal state machine or parity error), smPIV (SMT induced PHY_invalid), EBou (Elasticity Buffer overrun and underrun errors), PSTP (PHY in STOP mode), HSTP (HMUX in STOP mode) and P (PHY_Invalid). These signals are generated by receiver 8, by HMUX 10 or by configuration switch 12.

The Vx, Ix and Px internal codes carry line state information as follows: u?LS (last known line state (where ? is an A for active, an I for idle, a C for cycle, an M for master, an H for halt, a Q for quiet, or an N for 20 noise)), k?LS (current line state (where ? is A for active, I for idle, C for cycle, M for master, H for halt, Q for quiet, or N for noise), kNSD (signal detect (SD) or clock detect (CD) inactive. The $I_x$ column of Table B is used to determine the pair of 4-bit symbols if at least one of the received 5-bit symbols representing the current line state is an idle symbol (11111). If neither of the 5-bit symbols representing the current line state is an idle symbol, the $V_x$ column of Table B is used to determine the pair of 4-bit symbols. The symbols in the Ix and Vx columns which are identified by the letter I or V along with the number zero and an identifying number (e.g., V03) are violation symbols. The blank spaces in Table B are interpreted as violation codes. The Ix and Vx columns are used by the PHY to indicate line state information. The Ix column is used when an Idle Symbol is detected in the received data stream, otherwise the Vx column is used by the PHY. The I and V columns are not used by receiver 8. However, they are used by the HMUX and MAC (when PHY 7 is operating as a conventional PHY in an FDDI station) to generate Idle patterns and to indicate violations such as parity errors and internal state machine errors. The Px columns are used by the PHY, HMUX and MAC to indicate PHY_Invalid conditions.

Table BB sets forth an alternate set of code points which may be enabled by programming a bit in a mode register in control register block 29 of PHY 7.

TABLE A

5B–4B Symbol Encoding

| Symbol | 5B Code | Outgoing 4B |
|---|---|---|
| 0 | 11110 | 0000 |
| 1 | 01001 | 0001 |
| 2 | 10100 | 0010 |
| 3 | 10101 | 0011 |
| 4 | 01010 | 0100 |
| 5 | 01011 | 0101 |
| 6 | 01110 | 0110 |
| 7 | 01111 | 0111 |
| 8 | 10010 | 1000 |
| 9 | 10011 | 1001 |
| A | 10110 | 1010 |
| B | 10111 | 1011 |
| C | 11010 | 1100 |
| D | 11011 | 1101 |
| E | 11100 | 1110 |
| F | 11101 | 1111 |
| I (Idle) | | 11111 |
| Q (Quiet) | | 00000 |
| H (Halt) | | 00100 |
| J (Starting Delimiter) | | 11000 |
| K (Starting Delimiter) | | 10001 |
| T (Ending Delimiter) | | 01101 |
| R (Reset) | | 00111 |
| S (Set) | | 11001 |
| L (Starting Delim) | | 00101 |
| N (Data w/Code) | | 11110 |
| V (Violation) | | 00001 |
| V | | 00010 |
| V | | 00011 |
| V | | 00110 |
| V | | 01000 |
| V | | 01100 |
| V | | 10000 |

Note: See Table B for 4-Bit Control Symbol Pairs

TABLE B

4-Bit Control Symbol Pairs Generated by Receiver and HMUX

| | | Upper Symbol | | | | | | | | | | | | | | | |
|---|---|---|---|---|---|---|---|---|---|---|---|---|---|---|---|---|---|
| Lower Symbol | | 0000<br>N | 0001<br>H | 0010<br>V | 0011<br>Vx | 0100<br>L | 0101<br>T | 0110<br>R | 0111<br>S | 1000 | 1001 | 1010<br>I | 1011<br>Ix | 1100<br>Px | 1101<br>J | 1110<br>Px | 1111<br>Px |
| 0000 | N | | HN | VN | | LN | TN | RN | SN | | | IN | kALS | | | | |
| 0001 | H | NH | HH | VH | | LH | TH | RH | SH | | | IH | kILS | | | | |
| 0010 | V | NV | HV | VV | kNSD | LV | TV | RV | SV | | | IV | PSTP | | | HSTP | |
| 0011 | | | | PERR | | | | | | | | | KCLS | | | IERR | |
| 0100 | L | NL | HL | YL | kMLS | LL | TL | RL | SL | | | IL | | | | | |
| 0101 | T | NT | HT | VT | kHLS | LT | TT | RT | ST | | | IT | | | SMC | | |
| 0110 | R | NR | HR | YR | kQLS | LR | TR | RR | SR | | | IR | | | | | |
| 0111 | S | NS | HS | VS | kNLS | LS | TS | RS | SS | | | IS | kNLS | | SSC | | |
| 1000 | | | | | uALS | | | | | | | | uALS | | | | |
| 1001 | | | | | uILS | | | | | | | | uILS | | | | |
| 1010 | I | NI | HI | VI | EBo/u | LI | TI | RI | SI | | | II | smPIV | | SAS | | |
| 1011 | Y | | | | uCLS | | | | | | | | uCLS | | SCC | | |
| 1100 | | | | | uNLS | | | | | | | | uMLS | | | | |
| 1101 | K | | | | uHLS | | | | | | | | uHLS | | SFS | | |
| 1110 | | | | | uQLS | | | | | | | | UQLS | | | | |
| 1111 | | | | | uNLS | | | | | | | | uNLS | | | | |

TABLE BB

Alternate Code Points Generated by Receiver and HMUX

| | | D7:4 | | | | | | | | | | | | | | | |
|---|---|---|---|---|---|---|---|---|---|---|---|---|---|---|---|---|---|
| D3:0 | | 0000<br>N | 0001<br>R | 0010<br>Vx | 0011<br>Vx | 0100 | 0101<br>L | 0110 | 0111<br>I | 1000<br>V | 1001<br>S | 1010<br>Ix | 1011<br>Ix | 1100<br>J | 1101<br>T | 1110<br>Px | 1111<br>Px |
| 0000 | N | | RN | | kALS | | LN | | IN | VN | SN | | kALS | | TN | | |
| 0001 | R | NR | RR | | kILS | | LR | | IR | VR | SR | | kILS | | TR | | |
| 0010 | | | | | | | | | | | | | | | | PSTP | HSTP |
| 0011 | K | | | PERR | kCLS | | | | | | | | kCLS | SFS | | IERR | |
| 0100 | | | | | | | | | | | | | | | | | kMLS |
| 0101 | L | NL | RL | | | | LL | | IL | VL | SL | | | | TL | | kHLS |
| 0110 | | | | | | | | | | | | | | | | | kQLS |
| 0111 | I | NI | RI | | | | LI | | II | VI | SI | | | SAS | TI | | kNLS |
| 1000 | V | NV | RV | | uALS | | LV | | IV | VV | SV | | uALS | | TV | | |
| 1001 | S | NS | RS | | uILS | | LS | | IS | VS | SS | | uILS | SSC | TS | | |
| 1010 | | | | | | | | | | | | | | | | | smPIV |
| 1011 | | | | | uCLS | | | | | | | | uCLS | SCC | | | |
| 1100 | | | | | | | | | | | | | | | | | uMLS |
| 1101 | T | NT | RT | | | | LT | | IT | VT | ST | | | SMC | TT | | uHLS |
| 1110 | | | | | | | | | | | | | | | | | uQLS |
| 1201 | | | | | | | | | | | | | | | | | uNLS |

The symbol decoder 20 also decodes line state symbols. The decoded line state symbols are provided to line state detector 22 which determines the current line state. The line states recognized by the line state detector 22 include the following. A quiet line state (QLS) is identified upon the receipt of 8 consecutive quiet symbol pairs. The halt line state (HLS) is identified upon the receipt of eight consecutive halt symbol pairs. The master line state (MLS) is identified upon the receipt of eight consecutive halt-quiet symbol pairs. The idle line state (ILS) is identified upon the receipt of two consecutive idle symbol pairs. A super idle line state, while not a separate line state, is identified upon the reception of eight consecutive idle symbol pairs. The active line state (ALS) is identified upon the reception of the starting delimiter JK. The cycle line state (CLS) is identified when hybrid mode is enabled upon the reception of an R or S symbol pair (i.e., RR, SS, RS or SR) while in active line state immediately after the starting delimiter. The no signal detect (NSD) state or off line state (OLS) is identified upon the deassertion of the signal detect or internal clock detect signal from phaser 2 and eight quiet symbol pairs nominally. No Signal Detect indicates that the incoming link is inactive. The noise line state (NLS) is identified upon the reception of sixteen erroneous symbol pairs without satisfying the criteria for entry to another line state. The line state unknown (LSU) state is identified upon the reception of a symbol pair that causes exit from the current known line state without causing entry to a new line state.

For example, if the last eight consecutive symbol pairs received were quiet symbol pairs, the current line state would be known to be QLS. This line state is represented as kQLS in Tables B and BB, for known QLS. If the next symbol pair received consists of halt symbols, the current line state is unknown, and would be represented as uQLS, because QLS was the last known line state. The current line state would remain unknown (uQLS) until enough symbol pairs were received to identify the line state. For instance, if halt symbol pairs continued to be received, the current line state would be identified as HLS (kHLS) upon receipt of the eighth consecutive halt symbol pair.

After identifying the current line state, the line state detector 22 generates a pair of 4-bit symbols representing the current line state (along with an additional bit which indicates that the pair of 4-bit symbols represents a control symbol pair). The appropriate conversion is defined by Tables B and BB. Therefore, if Table B is in use, for a known halt line state, the appropriate 4-bit symbol pair is 0011 0101, and for a known idle line state, the appropriate 4-bit symbol pair is 1011 0001.

The output of line state detector 22 is provided to post decoder 26. The post decoder 26 receives input from symbol decoder 20, line state detector 22 and HMUX receiver 24 and provides an output to elasticity buffer 28. While data is being received, the post decoder 26 routes the output of the symbol decoder 20 to the elasticity buffer 28. While line state information is being received, the output of the line state detector 22 is routed through the post decoder 26 to the elasticity buffer 28. Both symbol decoder 20 and line state detector 22 provide symbols to the post decoder 26.

The HMUX receiver 24 monitors the incoming data stream for FDDI-II data and checks the validity of identified cycles. The results of these validity tests are passed to the HMUX block 10 to assist in further processing. HMUX receiver 24 also provides control signals to post decoder 26 to cause decoder 26 to filter information when the pass all symbols mode is disabled or to pass information without filtering when the pass all symbols mode is enabled.

The elasticity buffer 28 functions as a logical FIFO buffer to compensate for the variation between the recovered receive clock and the clock within the PHY 7. The output of the elasticity buffer 28 is transmitted to the HMUX block 10. HMUX block 10 performs the functions defined in *FDDI Hybrid Ring Control (HRC), Draft Proposed American National Standard*, May 28, 1992 incorporated herein by reference. The output of HMUX block 10 is passed to the configuration switch 12.

Within the receiver block 8, the receiver control interface 30 contains control and status registers which provide an interface to an external device such as a microcontroller or a station management block. During operation as a repeater as shown in FIG. 1, microcontroller 9 programs two bits in a control register within receiver control interface 30. These bits enable the pass all symbols mode and noise filtering mode previously discussed.

When the pass all symbols mode is enabled, HMUX receiver 24 allows post decoder 26 to pass all symbols without filtering. Symbol decoder 20 converts violation symbols to a 4-bit V symbol, which is a violation symbol.

If the pass all symbols mode is not enabled, the HMUX receiver 24 causes post decoder 26 within the receiver 8 to filter violation symbols and any other symbols which are not valid in their present context as previously described.

When the noise filtering mode is enabled, the line state detector 22 monitors the duration of any noise line state (NLS) received. When noise line state is received for a period of time longer than a preselected threshold time period, post decoder 26 inserts a PHY_Invalid control code (P), rather than the noise line state control code (kNSD) until a valid line state (ILS, HLS, MLS, QLS or NSD) is received by the line state detector 22. The PHY_Invalid control code indicates that the continuity of the received symbol stream has been compromised. The PHY_Invalid control code causes the transmitter 14 to enter the off transmit mode, thereby disabling transmitter 14. When the downstream receiving station 5 detects there is no signal from transmitter 14, the SMT 23 within the receiving station 5 will break the connection and may subsequently initiate line state signalling in an attempt to re-initialize the connection with the upstream transmitting station 3.

Details of The Transmitter Block

Figure 8:
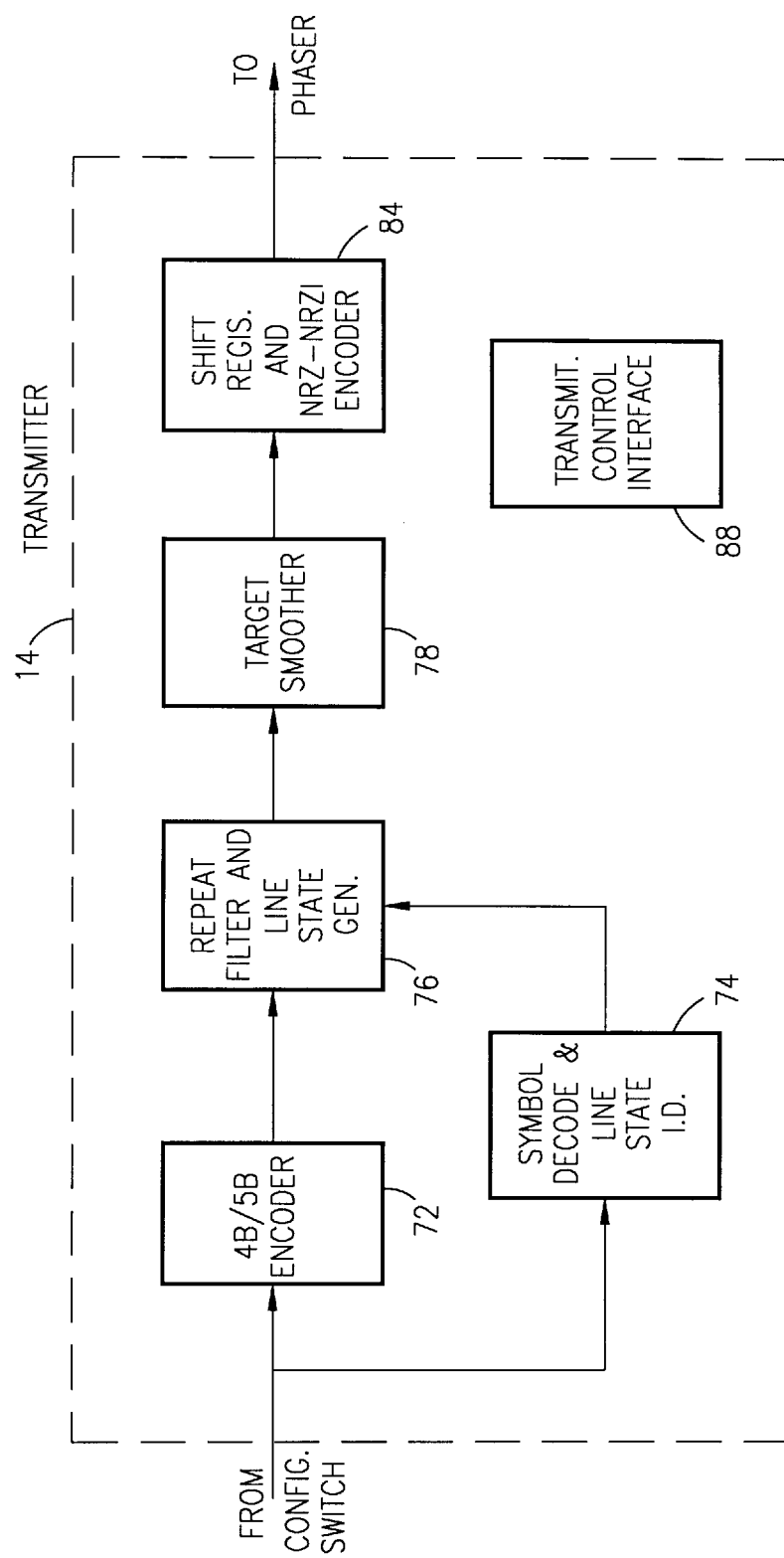
FIG. 8 is a block diagram of the transmitter of the PHY repeater of the present invention.

Turning to FIG. 8, the transmitter block 14 includes the following functional blocks: 4B/5B encoder 72, symbol decode and line state identifier 74, repeat filter and line state generator 76, target smoother 78, shift register and NRZ to NRZI encoder 84, and transmitter control interface 88.

The following examples describe how the transmitter 14 processes a data symbol, a control symbol (which includes a violation symbol) and a line state when the pass violation symbol and pass line state modes are enabled.

The 4B/5B encoder 72 receives pairs of 4-bit symbols (along with the additional bit indicating whether these symbols represent data or control symbols) from configuration switch 12 and converts them into paired 5-bit symbols, which are transmitted to repeat filter and line state generator 76. The conversion of data symbols is illustrated in the upper portion of Table C. Thus, the pair of 4-bit data symbols, 0001 and 0010, becomes 01001 10100.

The conversion from control symbols is illustrated in the lower portion of Table C and in Table D. First, the letters corresponding to the 4-bit control symbols are determined from Table D. For example, the letters corresponding to the pair of 4-bit control symbols, 0000 0010 are NV. Next, the pair of 5-bit control symbols corresponding to these letters is determined from the lower portion of Table C. For example, the pair of 5-bit control symbols corresponding to NV is 11110 10001. The violation symbol V is encoded as the symbol "K" (10001). The transmitter interprets as PHY_Invalid ("P") anything in the last 4 columns of Table D except starting delimiters (SMC, SSC, SAC, SCC, SFC). The transmitter interprets starting delimiters as a JK symbol pair.

Table DD sets forth an alternate set of code points which may be enabled by setting a bit in the mode register of control register block 29. The transmitter interprets as PHY_Invalid anything in the last 2 columns of Table DD, and anything in the Vx or Ix columns except kILS, uILS, kALS, uALS, kCLS and uCLS.

TABLE C

| 4B/5B Symbol Encoding | | |
|---|---|---|
| Symbol | 4B Code | Outgoing 5B |
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |
| E | 1110 | 11100 |
| F | 1111 | 11101 |
| I (Idle) | | 11111 |
| Q (Quiet) | | 00000 |
| H (Halt) | | 00100 |
| J (First Starting Delimiter Symbol) | | 11000 |
| K (Second Starting Delimiter Symbol) | | 10001 |
| T (Ending Delimiter) | | 01101 |

TABLE C-continued

| | |
|---|---|
| R (Reset) | 00111 |
| S (Set) | 11001 |
| L (Packet Starting Delimiter) | 00101 |
| N (Data mixed with Code) | 11110 |
| V (Violation) | 10001 (Same as "K") |

Note: See Table D for 4-Bit Control Symbol Pairs

TABLE D

4-Bit Control Symbol Pairs Interpreted by Transmitter

| | Upper Symbol | | | | | | | | | | | | | | | |
|---|---|---|---|---|---|---|---|---|---|---|---|---|---|---|---|---|
| Lower Symbol | 0000 N | 0001 H | 0010 V | 0011 Vx | 0100 L | 0101 T | 0110 R | 0111 S | 1000 | 1001 | 1010 I | 1011 Ix | 1100 Px | 1101 J | 1110 Px | 1111 Px |
| 0000 | N | HN | VN | kALS | LN | TN | RN | SN | | | IN | kALS | P | P | P | P |
| 0001 | H | NH | HH | VH | kILS | LH | TH | RH | SH | | IH | kILS | P | P | P | P |
| 0010 | V | NV | HV | VV | kNSD | LV | TV | RV | SV | | IV | kNSD | P | P | P | P |
| 0011 | | | | V03 | kCLS | | | | | | I03 | kCLS | P | P | P | P |
| 0100 | L | NL | HL | VL | kMLS | LL | TL | RL | SL | | IL | kMLS | P | P | P | P |
| 0101 | T | NT | HT | VT | kHLS | LT | TT | RT | ST | | IT | kHLS | P | SMC | P | P |
| 0110 | R | NR | HR | VR | kQLS | LR | TR | RR | SR | | IR | kQLS | P | P | P | P |
| 0111 | S | NS | HS | VS | kNLS | LS | TS | RS | SS | | IS | kNLS | P | SSC | P | P |
| 1000 | | | | V08 | uALS | | | | | | I08 | uALS | P | P | P | P |
| 1001 | | | | V09 | uILS | | | | | | I09 | uILS | P | P | P | P |
| 1010 | I | NI | HI | VI | P | LI | TI | RI | SI | | II | P | P | SAS | P | P |
| 1011 | Y | | | V0B | uCLS | | | | | | I0B | uCLS | P | SCC | P | P |
| 1100 | | | | V0C | uMLS | | | | | | I0C | uMLS | P | P | P | P |
| 1101 | K | | | V0D | uHLS | | | | | | I0D | uHLS | P | SFS | P | P |
| 1110 | | | | V0E | uQLS | | | | | | I0E | uQLS | P | P | P | P |
| 1111 | | | | V0F | uNLS | | | | | | I0F | uNLS | P | P | P | P |

TABLE DD

Alternate Code Points Interpreted by the Transmitter

| | D7:4 | | | | | | | | | | | | | | | |
|---|---|---|---|---|---|---|---|---|---|---|---|---|---|---|---|---|
| D3:0 | 0000 N | 0001 R | 0010 Vx | 0011 Vx | 0100 | 0101 L | 0110 | 0111 I | 1000 V | 1001 S | 1010 Ix | 1011 Ix | 1100 J | 1101 T | 1110 Px | 1111 Px |
| 0000 | N | | RN | V00 | kALS | | LN | | IN | VN | SN | I00 | kALS | | TN | P00 | P10 |
| 0001 | R | NR | RR | V01 | kILS | | LR | | IR | VR | SR | I01 | kILS | | TR | P01 | P11 |
| 0010 | | | | V02 | V12 | | | | | | | I02 | I12 | | | P02 | kNSD |
| 0011 | K | | | V03 | kCLS | | | | | | | I03 | kCLS | SFS | | P03 | P13 |
| 0100 | | | | V04 | V14 | | | | | | | I04 | I14 | | | P04 | kMLS |
| 0101 | L | NL | RL | V05 | V15 | | LL | | IL | VL | SL | I05 | I15 | | TL | P05 | kHLS |
| 0110 | | | | V06 | V16 | | | | | | | I06 | I16 | | | P06 | kQLS |
| 0111 | I | NI | RI | V07 | V17 | | LI | | II | VI | SI | I07 | I17 | SAS | TI | P07 | kNLS |
| 1000 | V | NV | RV | V08 | uALS | | LV | | IV | VV | SV | I08 | uALS | | TV | P08 | P18 |
| 1001 | S | NS | RS | V09 | uILS | | LS | | IS | VS | SS | I09 | uILS | SSC | TS | P09 | P19 |
| 1010 | | | | V0A | V1A | | | | | | | I0A | I1A | | | P0A | smPIV |
| 1011 | | | | V0B | uCLS | | | | | | | I0B | uCLS | SCC | | P0B | P1B |
| 1100 | | | | V0C | V1C | | | | | | | I0C | I1C | | | P0C | P1B |
| 1101 | T | NT | RT | V0D | V1D | | LT | | IT | VT | ST | I0D | I1D | SMC | TT | P0D | uHLS |
| 1110 | | | | V0E | V1E | | | | | | | I0E | I1E | | | P0E | uQLS |
| 1111 | | | | V0F | V1F | | | | | | | I0F | I1F | | | P0F | uNLS | sends a control signal to the repeat filter and line state generator 76 when the pass line state mode is enabled. This control signal causes the repeat filter and line state generator 76 to generate a pair of 5-bit symbols corresponding to the identified line state. For example, the 5-bit symbol pair for a known halt line state would be 00100 00100.

FIG. 9 shows the state diagram of repeat filter and line state generator 72. Addenda A and B show equations for the repeat filter and line state generator 76. Notes further explaining the operation of the repeat filter and line state To process line state information, the symbol decode and line state identifier 74 of transmitter block 14 receives the current line state information in the form of paired 4-bit symbols from the configuration switch 12. The symbol decode and line state identifier 74 identifies the current line state from the paired 4-bit symbols in accordance with the Vx and Ix columns of Table D (or Table DD). Thus, the 4-bit symbol pair, 1011 0101, is identified as a known halt line state. The symbol decode and line state identifier 74 then generator 76 follow. In Addenda A and B, the signals from symbol decoder and line state identifier 74 are shown as usx [4:0] and lsx [4:0] as defined in Addenda B. The signals from encoder 72 are shown as us_? and ls_?

The remainder of the transmitter block 14 operates as follows. The target smoother 78 operates to control the preamble length of frames and cycles. The target smoother operates in accordance with *FDDI Physical Layer Protocol (PHY-2), Draft Proposed American National Standard*, American National Standards Institute, Jun 17, 1992, supra. The target smoother 78 is coupled to the shift register and NRZ to NRZI encoder 84 which converts encoded parallel data to serial data and also converts from NRZ to NRZI data, if necessary. The shift register and NRZ to NRZI encoder 84 then sends the serial data through the phaser 2 to the receiving station 5.

The transmitter control interface 88 contains control and status registers which provide an interface to an external device such as a microcontroller or a station management block. During operation as a repeater as shown in FIG. 1, microcontroller 9 programs two bits in a control register within transmitter control interface 88 to enable the pass violation symbol mode and the pass line states mode.

When the pass violation symbol mode is enabled, repeat filter and line state generator 76 replaces violation symbols with the FDDI symbol, K (10001).

When the pass violation symbol mode is not enabled, the repeat filter and line state generator 76 generates signals in accordance with FDDI-I and FDDI-II standards, as previously discussed.

When the pass line state mode is enabled, if symbol decode and line state identifier 74 identifies a line state, the line state is generated by repeat filter 76.

If the pass line state mode is enabled and a quiet, halt or master line state is decoded from the input symbols by identifier 74, the repeat filter and line state generator 76 will continue to generate a quiet, halt or master line state, respectively, until another valid line state is decoded and/or until the CTSR register is reprogrammed.

When the pass line state mode is not enabled, the repeat filter and line state generator 76 operates as previously discussed.

It should be understood that various alternatives to the embodiments of the invention described herein may be employed in practicing the invention. It is intended that the following claims define the scope of the invention and that the structures and methods within the scope of these claims and their equivalents be covered thereby.

ADDENDUM A

Transmitter Repeat Filter/Line State Generator State Actions and Design Notes

```
global = rfn0| rfn1 | rfn3 | rfn4 | rfn5,
if(rfn0 | rf30 | rf40 | rf50 | rf20a | rf20b | rf10b | (rf0 & ~global)))) then(;force Idles
    if(ITM | ~ pvs)
        then(us_out[4:0] = I_sym,
             ls_out[4:0] = I_sym),
        else(
                if(usym_V)
                    then(us_out[4:0] = K_sym),
                    else(us_out[4:0] = usx[4:0]),
                if(lsym_V)
                    then(ls_out[4:0] = K_sym),
                    else(ls_out[4:0] = lsx[4:0]))
if(rf10a) then(
    if(T_Flag) then(
        if(us_I & lsym_RST|~usym_RSTI & ~pvs)
            then(us_out [4:0] = T_sym),
        else if(usym_RSTI)
            then(us_out[4:0] = usx[4:0]),
            else(us_out[4:0] = K_sym),
        if(lsym_RSTI)
            then(ls_out[4:0] = lsx[4:0]),
            else if(pvs)
                then(ls_out[4:0] = K_sym),
                else if((us_out = I_sym)|
                    (us_out = T_sym) & (Out_ct = 2))
                    then(ls_out[4:0] = I_sym),
                    else(ls_out[4:0] = T_sym) ),
    else if(C_Flag) then(
        if(us_I | ~pvs)
            then(us_out[4:0] = I_sym),
            else(us_out[4:0] = K_sym),
        if(ls_I | ~pvs)
            then(ls_out[4:0] = I_sym),
            else(ls_out[4:0] = K_sym) ),
    else(if(us_I | us_N)
        then(us_out[4:0] = I_sym),
        else if(us_H | ~pvs)
            then(us_out [4:0] = H_sym),
            else(us_out[4:0] = K_sym),
        if(us_out[4:0] = H_sym)
            then(ls_out[4:0] = H_sym),
            else if(ls_I | ~pvs)
                then(ls_out[4:0] = I_sym),
                else(ls_out[4:0] = K_sym) ))
if(rfn1) then(
    us_out [4:0] = usx[4:0],      ;repeat start delimiter
    ls_out[4:0] = lsx[4:0],
    if(SAS_delim) then
        Set_T_Flag = 1,
    else
        Clear_T_Flag = 1,
    if(SFS_delim) then
```

ADDENDUM A-continued

Transmitter Repeat Filter/Line State Generator State Actions and Design Notes

```
                    Clear_C_Flag = 1,
        else
            if(~SAS_delim) then
                    Set_C_Flag = 1)
if(rf1 & ~global) then(              ;Repeat State Actions
    if(~C_Flag & (us_T | NT_pair)) then
            Set_T_Flag = 1,   ;Any T or NT in Basic Mode sets T_Flag
    if(~rf12 & ~rf10a & ~rf10b) then(
            if(usym_V)
                    then(us_out[4:0] = K_sym),
            else(us_out[4:0] = usx[4:0]),
            if(lsym_V)
                    then(ls_out[4:0] = K_sym),
            else(ls_out[4:0] = lsx[4:0]) ))
if(rf21) then(
    us_out[4:0] = usx[4:0],      ;repeat
    ls_out[4:0] = lsx[4:0])
if(rf12 | rf20c | (rf2 & ~global & ~rf20a & ~rf20b & ~rf21)) then(
if(C_Flag) then(
    if(usym_RSTI)
            then(us_out[4:0] = usx[4:0]),
        else if(us_N & ls_I)
            then(us_out [4:0] = I_sym),
            else(us_out[4:0] = L_sym),
    if(lsym_RSTI)
            then(ls_out [4:0] = lsx[4:0]),
        else if(us_I & ~ls_L)
            then(ls_out[4:0] = I_sym),
            else(ls_out[4:0] = L_sym)),
else(us_out[4:0] = H_sym,
    ls_out[4:0] = H_sym))
if(rfn3 | (rf3 & ~global & ~rf30)) then( ;;force QLS
    tx_quiet = 1,
    us_out[4:0] = Q_sym,
    ls_out[4:0] = Q_sym)
if(rfn4 | (rf4 & ~global & ~rf40)) then( ;;force HLS
    us_out[4:0] = H_sym,
    ls_out[4:0] = H_sym)
if(rfn5 | (rf5 & ~global & ~rf50)) then( ;;force MLS
us_out[4:0] = H_sym,
ls_out[4:0] = Q_sym)
```

ADDENDUM D

HMUX Receiver State Machine Actions:

```
HRX0:; Preamble
    FORCE_II ; force preamble
HRX1:; Cycle Control field
    FORCE_WW=~PRMR_PAS,;force R, S or T
HRX2:; Cycle Sequence field
    FORCE_00=(CS_RC[7:0] = 00) & ~PRMR_PAS     ;force zero if invalid CSrc
HRX3:; Programming Template field
    FORCE_WW=~PRMR_PAS,; force R, S or T
HRX4:; Cycle Body
    FORCE_GG=~PRMR_PAS, ; force N, I, L, R, S or T
HRX5:; Frame
if(~NN)
        then(T_Flag ← 1),
    if(T_Flag)
        then(FORCE_YY=~PRMR_PAS),; force I, L, R, S or T
        else(FORCE_GG=~PRMR_PAS),; force N, I, L, R, S or T
Output Byte Assembly 1:; Output Byte Assembly
DDOUT[9]=~DDOUT[8] ! (uparity ! lparity),
if(~(FORCE_00|FORCE_WW|FORCE_YY|FORCE_GG) )
                                            ;NO filtering (eg. PAS=1)
    then(DDOUT[8]=~NN,
        DDOUT[7:4] = usl[3:0], uparity = usl[4],
        DDOUT[3:0] = lsl[3:0], lparity = lsl[4]),
    if(FORCE_00)
        then(DDOUT[8:0] = 0),; always generates correct parity
    if(FORCE_WW)
```

ADDENDUM D-continued

HMUX Receiver State Machine Actions:

```
        then(DDOUT[8] = 1,
            if(WX)
                then(DDOUT[7:4] = usl[3:0], uparity = usl[4]),
                else(DDOUT[7:4] = codeT[3:0], uparity = codeT[4]),
            if(XW)
                then(DDOUT[3:0] = lsl[3:0], lparity = lsl[4]),
                else(DDOUT[3:0] = codeT[3:0], lparity = codeT[4])),
    if(FORCE_YY)
        then(DDOUT[8] = 1,
            if(YX)
                then(DDOUT[7:4] = usl[3:0], uparity = usl[4]),
                else(DDOUT[7:4] = codeL[3:0], uparity = codeL[4]),
            if(XY)
                then(DDOUT[3:0] = lsl[3:0], lparity = lsl[4]),
                else if(IX)
                    then(DDOUT[3:0] = codeI[3:0], lparity = codeI[4]),
                    else(DDOUT[3:0] = codeL[3:0], lparity = codeL[4])),
    if(FORCE_GG)
        then(if(NN) then(DDOUT[8] = 0,
                DDOUT[7:4] = usl[3:0], uparity = usl[4],
                DDOUT[3:0] = lsl[3:0], lparity = lsl[4]),
            else(DDOUT[8] = 1,
                if(GX) then(DDOUT[7:4] = usl[3:0], uparity = usl[4]),
                    else(DDOUT[7:4] = codeL[3:0], uparity = codeL[4]),
                if(XG) then(DDOUT[3:0] = lsl[3:0], lparity = lsl[4]),
                    else if(IX)
                        then(DDOUT[3:0] = codeI[3:0], lparity = codeI[4]),
                        else(DDOUT[3:0] = codeL[3:0], lpariy = codeL[4])
```

ADDENDUM E

Enable Noise Filtering Design Notes

The following equations describe the Noise Filtering design:

```
if(noise_thresh_reached) then rcra[5] <- 1,
if(rcra[5] & prmr_ensf) then FILTER_NOISE <- 1,
if(~rcra[5]|~SM_IND[3] & Stuff|Start|PRST|~prmr_ensf) then
                                    FILTER_NOISE <- 0
```

> rcra[5] = bit in the receive condition register that indicates that the noise threshold has been reached
> noise_thresh_reached = no known line state received for a programmed amount of time
> prmr_ensf = Enable Noise Filtering signal from the Receiver control block registers
> FILTER_NOISE = the control signal which causes the incoming data stream to be replaced with a PHY_INVALID code point. This code point, when decoded by a transmitter, will cause Off line state to be transmitted.
> ~SM_IND[3] & Stuff = a known line state received
> Start = a start of frame or start of cycle received
> PRST = PHY Reset

What is claimed is:

1. A physical layer device for use in a communication system, said physical layer device comprising:
   a transmitter for receiving symbols and for transmitting symbols to a downstream station in response to the symbols received by said transmitter,
   said transmitter having a first mode in which in at least one line state, when said transmitter detects a violation symbol, said transmitter transmits a preselected symbol to said downstream station, said preselected symbol being recognizable as a violation symbol b,
   a physical layer device in said downstream station and
   said transmitter having a second mode in which in at least one line state, when said transmitter detects a violation symbol, said transmitter transmits a symbol or symbols different from said preselected symbol to said downstream station, said symbol or symbols being recognizable as a violation symbol by a media access controller in said downstream station.

2. The physical layer device of claim 1, further comprising a register having one or more programmable bits for enabling said first mode or said second mode of said transmitter.

3. The physical layer device of claim 1, wherein said preselected symbol is the FDDI symbol K.

4. The physical layer device of claim 1, further comprising a receiver for receiving symbols from an upstream station and for generating symbols in response to the received symbols, wherein said receiver has a mode in which for every violation symbol received by said receiver, said receiver generates a violation symbol.

5. The physical layer device of claim 1, further comprising means for passing all symbols received from an upstream station to said transmitter.

6. A physical layer device for use in a communication system, said physical layer device comprising:
   a transmitter for receiving symbols and for transmitting symbols to a downstream station in response to the symbols received by said transmitter,
   said transmitter having a first mode in which in at least one line state, when said transmitter detects a symbol which is not valid in its present context, said transmitter transmits a preselected symbol to said downstream station, said preselected symbol being recognizable
   said transmitter having a second mode in which in at least one line state, when said transmitter detects a symbol which is not valid in its present context, said transmitter transmits a symbol or symbols, different from said preselected symbol, to said downstream station, said symbol or symbols being recognizable as a violation symbol or violation symbols by a media access controller in said downstream station.

7. The physical layer device of claim 6, further comprising a register having one or more programmable bits for enabling said first mode or said second mode of said transmitter.

8. The physical layer device of claim 6, wherein said preselected symbol is the FDDI symbol K.

9. The physical layer device of claim 6, further comprising a receiver for receiving symbols from an upstream station and for generating symbols in response to the received symbols, wherein said receiver has a mode in which for every symbol which is not valid in its present context received by said receiver, said receiver generates a symbol which is not valid in its present context.

10. The physical layer device of claim 6, further comprising means for passing all symbols received from an upstream station to said transmitter.

11. A method for repeating symbols transmitted for reception by a downstream station, said method comprising the steps of:

receiving said symbols and sending corresponding symbols to said downstream station; and in a first mode, during said step of receiving and sending, replacing any violation symbol with a preselected symbol which is recognizable as a violation symbol by a physical layer device in said downstream station, and in a second mode, during said step of receiving and sending, replacing any violation symbol with a symbol or symbols different from said preselected symbol, said symbol or symbols recognizable as a violation symbol or violation symbols by a media access controller in said downstream station.

12. The method of claim 11, further comprising the step of setting one or more programmable bits in a register to enable said first mode or said second mode.

13. The method of claim 11, wherein said preselected symbol is the FDDI symbol K.

14. A method for repeating symbols transmitted for reception by a downstream station, said method comprising the steps of:

receiving said symbols and sending corresponding symbols to said downstream station; and in a first mode, during said step of receiving and sending, replacing any symbol which is not valid in its present context with a preselected symbol which is recognizable as a violation symbol by a physical layer device in said downstream station, and in a second mode, during said step of receiving and sending, replacing any symbol which is not valid in its present context with a symbol or symbols, different from said preselected symbol, said symbol or symbols recognizable as a violation symbol or violation symbols by a media access controller in said downstream station.

15. The method of claim 14, further comprising the step of setting one or more programmable bits in a register to enable said first mode or said second mode.

16. The method of claim 14, wherein said preselected symbol is the FDDI symbol K.

17. A physical layer device for use in a communication system, said physical layer device comprising a transmitter for receiving symbols and for transmitting symbols to a downstream station in response to the symbols received by said transmitter, said transmitter having a first mode in which in at least one line state, when said transmitter detects a violation symbol, said transmitter transmits a preselected symbol recognizable as a violation symbol by a physical layer device in said downstream station, wherein said preselected symbol is the FDDI symbol K.

18. The physical layer device of claim 17, further comprising a receiver for receiving symbols from an upstream station and for generating symbols in response to the received symbols, wherein said receiver has a mode in which for every violation symbol received by said receiver, said receiver generates a violation symbol.

19. The physical layer device of claim 17, further comprising means for passing all symbols received from an upstream station to said transmitter.

20. A physical layer device for use in a communication system, said physical layer device comprising a transmitter for receiving symbols and for transmitting symbols to a downstream station in response to the symbols received by said transmitter, said transmitter having a first mode in which in at least one line state, when said transmitter detects a symbol which is not valid in its present context, said transmitter transmits a preselected symbol recognizable as a violation symbol by a physical layer device in said downstream station, wherein said preselected symbol is the FDDI symbol K.

21. The physical layer device of claim 20, further comprising a receiver for receiving symbols from an upstream station and for generating symbols in response to the received symbols, wherein said receiver has a mode in which for every symbol which is not valid in its present context received by said receiver, said receiver generates a symbol which is not valid in its present context.

22. The physical layer device of claim 20, further comprising means for passing all symbols received from an upstream station to said transmitter.

23. A method for repeating symbols transmitted for reception by a downstream station, said method comprising the steps of:

receiving said symbols and sending corresponding symbols to said downstream station; and in a first mode, during said step of receiving and sending, replacing any violation symbol with a preselected symbol which is recognizable as a violation symbol by a physical layer device in said downstream station, wherein said preselected symbol is the FDDI symbol K.

24. A method for repeating symbols transmitted for reception by a downstream station, said method comprising the steps of:

receiving said symbols and sending corresponding symbols to said downstream station; and in a first mode, during said step of receiving and sending, replacing any symbol which is not valid in its present context with a preselected symbol which is recognizable as a violation symbol by a physical layer device in said downstream station, wherein said preselected symbol is the FDDI symbol K.

* * * * *